(12) United States Patent
Ma et al.

(10) Patent No.: US 12,469,442 B2
(45) Date of Patent: Nov. 11, 2025

(54) DISPLAY PANEL AND DISPLAY DEVICE

(71) Applicant: Wuhan Tianma Micro-Electronics Co., Ltd., Wuhan (CN)

(72) Inventors: Yangzhao Ma, Wuhan (CN); Hao Dai, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/577,394

(22) PCT Filed: Jan. 28, 2023

(86) PCT No.: PCT/CN2023/073551
§ 371 (c)(1),
(2) Date: Jan. 8, 2024

(87) PCT Pub. No.: WO2024/098558
PCT Pub. Date: May 16, 2024

(65) Prior Publication Data
US 2025/0265982 A1  Aug. 21, 2025

(30) Foreign Application Priority Data
Nov. 10, 2022 (CN) .......................... 202211407066.3

(51) Int. Cl.
*H10K 59/122* (2023.01)
*G09G 3/3225* (2016.01)
*G06V 40/13* (2022.01)

(52) U.S. Cl.
CPC ....... *G09G 3/3225* (2013.01); *G06V 40/1318* (2022.01); *G09G 2300/0426* (2013.01); *G09G 2300/0842* (2013.01); *G09G 2360/14* (2013.01)

(58) Field of Classification Search
CPC ......... G09G 3/3225; G09G 2300/0426; G09G 2300/0842; G09G 2360/14; G06V 40/1318; H10K 59/131
See application file for complete search history.

(56) References Cited

U.S. PATENT DOCUMENTS

2022/0069047 A1 * 3/2022 Yang .................... H10K 59/131
2024/0260321 A1 * 8/2024 Xu ........................ H10K 59/131

FOREIGN PATENT DOCUMENTS

CN   109410823       3/2019
CN   110265455 A     9/2019
(Continued)

*Primary Examiner* — Abdul-Samad A Adediran
(74) *Attorney, Agent, or Firm* — KDW Firm PLLC

(57) ABSTRACT

Provided are a display panel and a display device. The display panel includes a first display area and a second display area. Light transmittance in the first display area is larger than light transmittance in the second display area. The first display area includes multiple first light-emitting elements. The second display area includes multiple second light-emitting elements. The multiple first light-emitting elements and the multiple second light-emitting elements have the same distribution density. The second display area includes multiple first pixel circuits and multiple second pixel circuits. The multiple first pixel circuits are in a one-to-one correspondence electrically connected to the multiple first light-emitting elements. The multiple second pixel circuits are in a one-to-one correspondence electrically connected to the multiple second light-emitting elements.

19 Claims, 21 Drawing Sheets

(56) References Cited

FOREIGN PATENT DOCUMENTS

| CN | 113764501 A | 12/2021 |
|---|---|---|
| CN | 114005859 A | 2/2022 |
| CN | 114242759 A | 3/2022 |
| CN | 114335069 A | 4/2022 |
| CN | 114784073 A | 7/2022 |

* cited by examiner

DISPLAY PANEL AND DISPLAY DEVICE

CROSS-REFERENCE TO RELATED APPLICATIONS

This is a National Stage Application, filed under 35 U.S.C. 371 based on International Patent Application No. PCT/CN2023/073551, filed on Jan. 28, 2023, which claims priority to Chinese Patent Application No. 202211407066.3 filed on Nov. 10, 2022, the disclosures of which are incorporated herein by reference in their entireties.

TECHNICAL FIELD

The present application relates to the field of display technologies and, for example, a display panel and a display device.

BACKGROUND

With the development of display devices, full-screen technologies have received extensive attention and research.

To make a display device have functions of both a full-screen display and a front-facing photosensitive, for example, to achieve functions such as fingerprint recognition and front-facing imaging in a display area, a photosensitive element is generally built in the screen. Moreover, the pixel design of a photosensitive function area is adjusted, making the area both display and transmit light, thereby making the display device have functions of both the full-screen display and the front-facing photosensitive.

A related art generally uses methods of reducing a pixel density in the photosensitive function area or externally disposing pixel circuits in a transition area around the photosensitive function area to meet the need of the photosensitive function area for light transmittance. However, most of the preceding methods have problems such as poor display effect of the photosensitive function area.

SUMMARY

The present application provides a display panel and a display device to improve a display effect of a first display area while ensuring light transmittance in the first display area.

According to one aspect of the present application, a display panel is provided. The display panel includes a first display area and a second display area. Light transmittance in the first display area is larger than light transmittance in the second display area.

The first display area includes a plurality of first light-emitting elements. The second display area includes a plurality of second light-emitting elements. The plurality of first light-emitting elements and the plurality of second light-emitting elements have the same distribution density.

The second display area includes a plurality of first pixel circuits and a plurality of second pixel circuits. The plurality of first pixel circuits are in a one-to-one correspondence electrically connected to the plurality of first light-emitting elements. The plurality of second pixel circuits are in a one-to-one correspondence electrically connected to the plurality of second light-emitting elements.

According to another aspect of the present application, a display device is provided. The display device includes a display panel provided by any embodiment of the present application.

DETAILED DESCRIPTION

Figure 1:
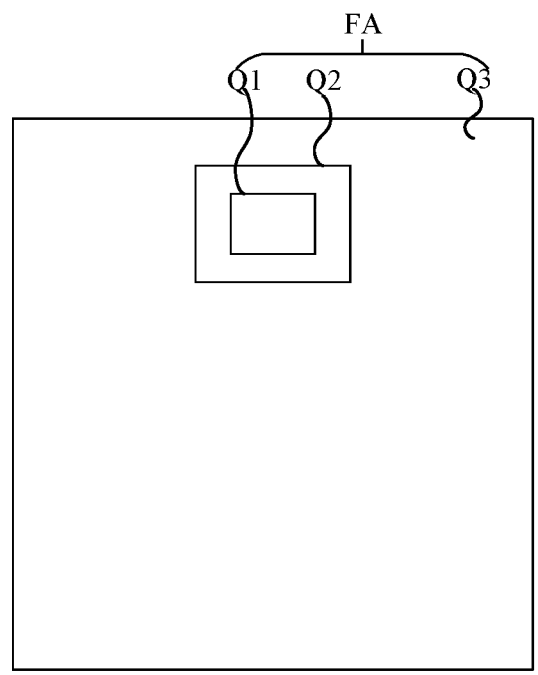
FIG. 1 is a structural diagram of an existing display panel.

FIG. 1 is a structural diagram of a display panel in a related art. As shown in FIG. 1, a display area FA of a display panel includes a first area Q1, a second area Q2, and a third area Q3. The second area Q2 is located between the first area Q1 and the third area Q3. Herein, the first area Q1 is the photosensitive function area having both display and photosensitive functions and can achieve photosensitive functions such as front-facing imaging or fingerprint recognition. The second area Q2 and the third area Q3 are areas having only a display function. The display function of the display panel is achieved by sub-pixels arranged in an array emitting light. Each sub-pixel includes a light-emitting element and a pixel circuit for driving the light-emitting element to emit light. The corresponding relationship between the light-emitting element and the pixel circuit may be that one pixel circuit corresponds to one light-emitting element, or one pixel circuit corresponds to at least two light-emitting elements. To ensure the display effect, generally, pixel circuits are configured to be in a one-to-one correspondence with light-emitting elements.

In the related art, to meet the requirement of the first area Q1 for light transmittance, the pixel circuits corresponding to the light-emitting elements in the first area Q1 are disposed in the second area Q2 (that is, the transition area). Thus, it is needed to compress the sizes of the pixel circuits corresponding to the light-emitting elements in the first area Q1 and the sizes of the pixel circuits corresponding to the light-emitting elements in the second area Q2 so that this part of pixel circuits can be integrated in the second area Q2. Since the area of the second area Q2 is relatively small and the compression space of the pixel circuits is limited, it is difficult to achieve the design in which the pixel circuits are in a one-to-one correspondence with the light-emitting elements when the light-emitting elements in the first area Q1 have a relatively high resolution. Alternatively, a solution where one pixel circuit drives multiple light-emitting elements at the same time is generally adopted so that an actual display Pixels Per Inch (PPI, the number of pixels per inch) in the first area Q1 is lower than that in the third area Q3, thereby causing a poor display effect of the first area Q1.

To solve the preceding problems, an embodiment of the present application provides a display panel including a first display area and a second display area. Light transmittance in the first display area is larger than light transmittance in the second display area. The first display area includes multiple first light-emitting elements. The second display area includes multiple second light-emitting elements. The multiple first light-emitting elements and the multiple second light-emitting elements have the same distribution density. The second display area includes multiple first pixel circuits and multiple second pixel circuits. The multiple first pixel circuits are in a one-to-one correspondence electrically connected to the multiple first light-emitting elements. The multiple second pixel circuits are in a one-to-one correspondence electrically connected to the multiple second light-emitting elements.

In the preceding solution, since in the first display area, the first light-emitting elements are disposed and no pixel circuits corresponding to the first light-emitting elements is disposed, thereby ensuring requirements of the first display area for the light transmittance. Since the second display area has more sufficient space, it is possible to compress the size of at least part of the pixel circuits to dispose both the first pixel circuits corresponding to the first light-emitting elements in the first display area and the second pixel circuits corresponding to the second light-emitting elements in the second display area, thereby achieving that the first pixel circuits are in a one-to-one correspondence electrically connected to the first light-emitting elements, and the second pixel circuits are in a one-to-one correspondence electrically connected to the second light-emitting elements. Moreover, since the first light-emitting elements and the second light-emitting elements have the same distribution density, the first display area and the second display area can have the same display PPI, thereby improving the display effect of the first display area.

Figure 2:
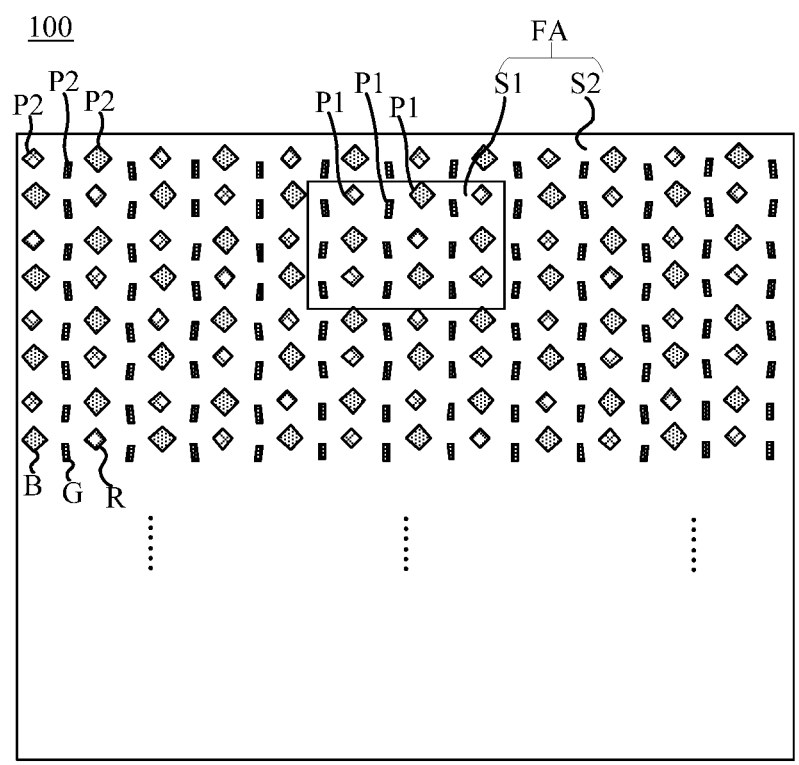
FIG. 2 is a structural diagram of a display panel according to an embodiment of the present application.
Figure 3:
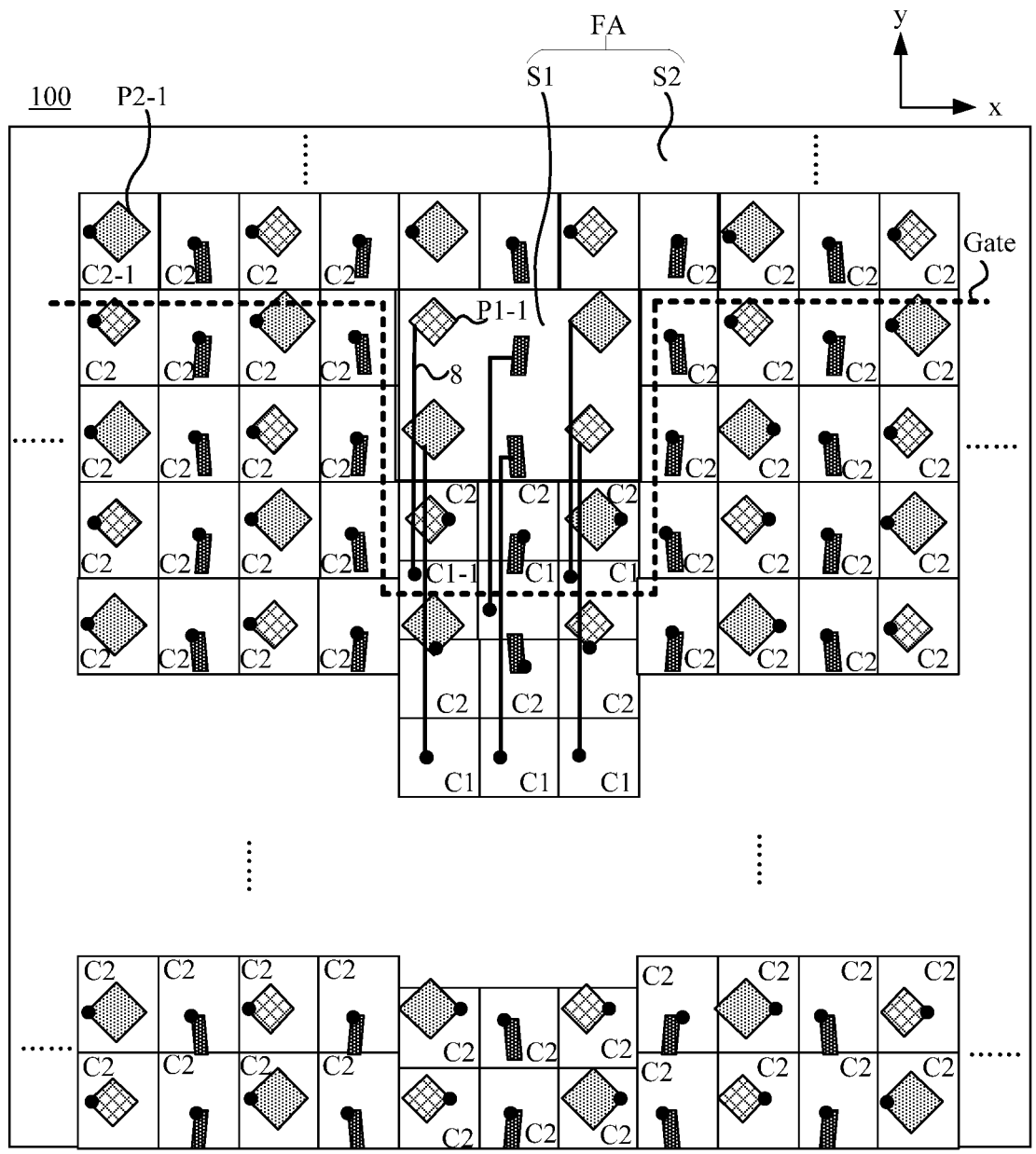
FIG. 3 is an enlarged structural diagram of a display panel according to an embodiment of the present application.

FIG. 2 is a structural diagram of a display panel according to an embodiment of the present application. FIG. 3 is an enlarged structural diagram of a display panel according to an embodiment of the present application. As shown in FIGS. 2 and 3, a display panel 100 provided by an embodiment of the present application includes a first display area S1 and a second display area S2. Light transmittance in the first display area S1 is larger than light transmittance in the second display area S2. The first display area S1 includes multiple first light-emitting elements P1. The second display area S2 includes multiple second light-emitting elements P2. The multiple first light-emitting elements P1 and the multiple second light-emitting elements P2 have the same distribution density. The second display area S2 includes multiple first pixel circuits C1 and multiple second pixel circuits C2. The multiple first pixel circuits C1 are in a one-to-one correspondence electrically connected to the multiple first light-emitting elements P1. The multiple second pixel circuits C2 are in a one-to-one correspondence electrically connected to the multiple second light-emitting elements P2.

Herein, the first display area S1 is the photosensitive function area. This area can be used to achieve both the display function and the photosensitive functions such as front-facing imaging and fingerprint recognition. The second display area S2 is a display area other than the first display area S1 in a total display area FA of the display panel and has the display function.

It should be noted that FIG. 2 shows an example where the display panel includes one first display area S1 located inside the total display area FA of the display panel. In other embodiments, the display panel may include a larger number of first display areas S1, any one of the first display areas S1 may be adjacent to at least one edge of the total display area FA of the display panel, and the number of first display areas S1 and the setting position of the first display areas S1 are not particularly limited in the embodiment of the present application.

As shown in FIG. 2, the first display area S1 includes multiple first light-emitting elements P1. The second display area S2 includes multiple second light-emitting elements P2. The multiple first light-emitting elements P1 and the multiple second light-emitting elements P2 have the same distribution density. In other words, the number of first light-emitting elements P1 in the same space is the same as the number of second light-emitting elements P2.

Illustratively, the multiple first light-emitting elements P1 may include at least two light-emitting elements having different light-emitting colors, and the multiple second light-emitting elements P2 may include at least two light-emitting elements having different light-emitting colors to achieve the color display. Exemplarily, referring to FIG. 2, the first light-emitting elements P1 include red light-emitting elements R having a light-emitting color of red, green light-emitting elements G having a light-emitting color of green, and blue light-emitting elements B having a light-emitting color of blue. The second light-emitting elements P2 include red light-emitting elements R having a light-emitting color of red, green light-emitting elements G having a light-emitting color of green, and blue light-emitting elements B having a light-emitting color of blue. Illustratively, the multiple first light-emitting elements P1 and the multiple second light-emitting elements P2 have the same distribution density. It is to be understood that in the first display area S1 and the second display area S2, the number of red light-emitting elements R in the same space size of the first display area S1 is the same as the number of red light-emitting elements R in the same space size of the second display area S2, the number of green light-emitting elements G in the same space size of the first display area S1 is the same as the number of green light-emitting elements G in the same space size of the second display area S2, and the number of blue light-emitting elements B in the same space size of the first display area S1 is the same as the number of blue light-emitting elements B in the same space size of the second display area S2. That is, the light-emitting elements with the same light-emitting color have the same distribution density in the first display area S1 and the second display area S2.

It should be noted that areas of the first light-emitting elements P1 in the first display area S1 and the second light-emitting elements P2 in the second display area S2, where the first light-emitting elements P1 and the second light-emitting elements P2 have the same light-emitting color, may be equal or not. Exemplarily, to improve the light transmittance in the first display area S1, the area of the first light-emitting elements P1 may be set to be smaller than the area of the second light-emitting elements P2, where the first light-emitting elements P1 and the second light-emitting elements P2 have the same light-emitting color. Alternatively, in the embodiment of the present application, since the first pixel circuits C1 electrically connected to the first light-emitting elements P1 are not disposed in the first display area S1, in other embodiments, in the case of ensuring the requirement of the light transmittance of the first display area S1, the area of the first light-emitting elements P1 may be appropriately increased so that the area of the first light-emitting elements P1 is larger than the area of the second light-emitting elements P2, where the first light-emitting elements P1 and the second light-emitting elements P2 have the same light-emitting color. This embodiment of the present application is not limited thereto.

It should also be noted that, in the display panel shown in FIG. 2, the arrangement manners of the first light-emitting elements P1 and the second light-emitting elements P2 are merely illustrative and not limiting. Those skilled in the art may set the arrangement manners of the pixels according to requirements. This embodiment of the present application is not limited thereto as long as the first light-emitting elements P1 and the second light-emitting elements P2 have the same distribution density.

Illustratively, a first light-emitting element P1 and a second light-emitting element P2 are organic light-emitting diodes (OLED). An OLED includes an anode, a light-emitting layer, and a cathode that are arranged in a stack. The shape of the first light-emitting element P1 or the shape of the second light-emitting element P2 shown in FIG. 2 may be understood as the shape of an orthographic projection of the anode in the light-emitting element on a plane where the display panel is located. It should be noted that, in the display panel shown in FIG. 2, the first light-emitting element P1 and the second light-emitting element P2 having the same light-emitting color have the same shape and are each polygonal. The shape of the first light-emitting element P1 and the second light-emitting element P2 are just illustrative and not limiting.

Figure 4:
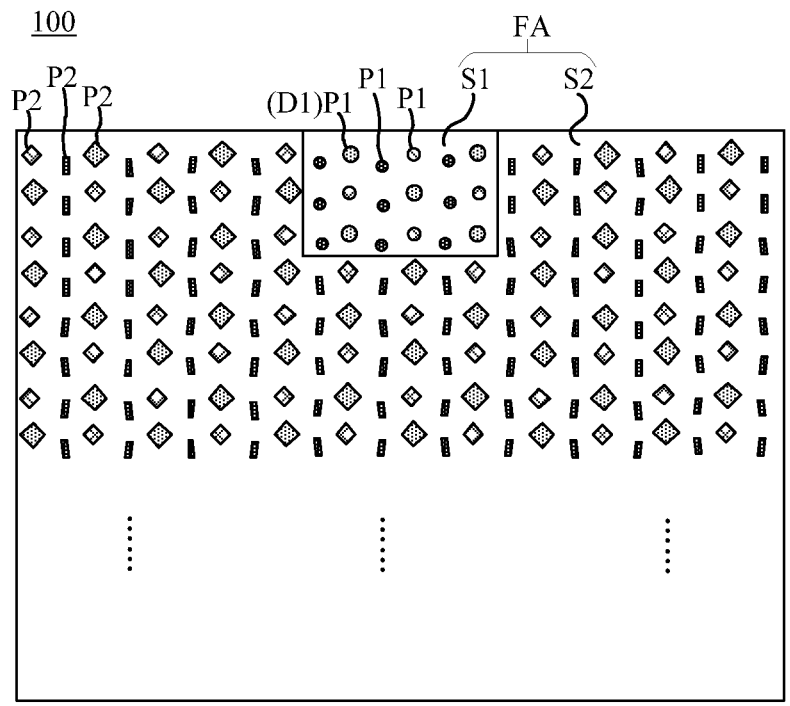
FIG. 4 is a structural diagram of another display panel according to an embodiment of the present application.

FIG. 4 is a structural diagram of another display panel according to an embodiment of the present application. As shown in FIG. 4, in other embodiments, the first light-emitting element P1 includes a first anode D1. The shape of an orthographic projection of the first anode D1 on the plane of the display panel is located is circular. Such arrangement can improve the diffraction phenomenon in the first display area S1 and facilitate improving the imaging quality of a photosensitive element disposed corresponding to the first display area S1 under the display panel. It should be noted that, in other embodiments, the shape of the first anode of the first light-emitting element P1 may be nearly-circular, such as elliptical, and this embodiment of the present application is not limited thereto.

Figure 5:
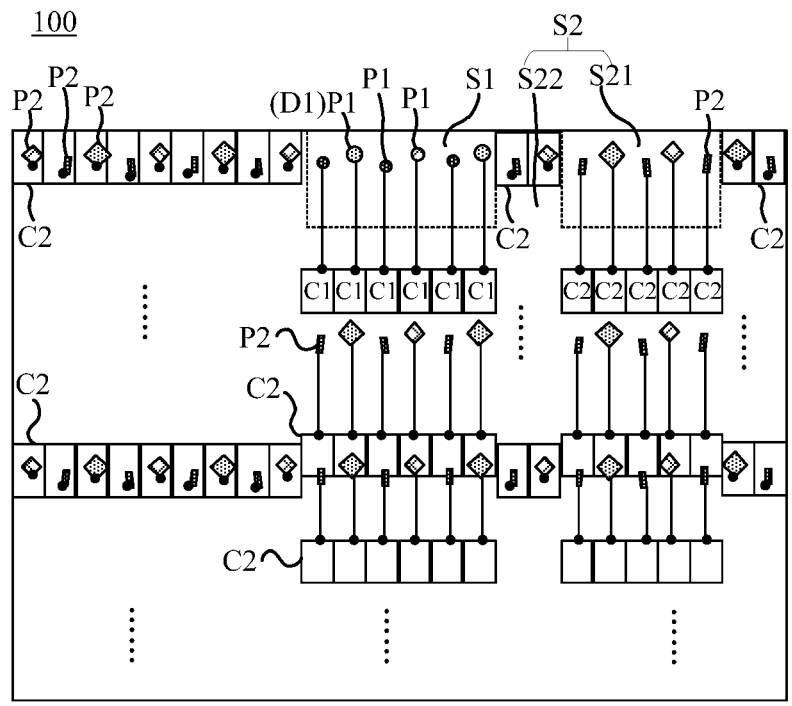
FIG. 5 is a structural diagram of another display panel according to an embodiment of the present application.

In addition, FIG. 5 is a structural diagram of another display panel according to an embodiment of the present application. As shown in FIG. 5, illustratively, the second display area S2 includes a first display area segment S21 and a second display area segment S22. The second pixel circuits C2 corresponding to the second light-emitting elements P2 in the first display area segment S21 is located in the second display area segment S22. Illustratively, multiple second light-emitting elements P2 are disposed in the first display area segment S21 but the second pixel circuits C2 corresponding to the multiple second light-emitting elements P2 are not disposed in the first display area segment S21. In this way, the first display area segment S21 also has a certain light transmittance. The first display area segment S21 may be used as a photosensitive function area, and the photosensitive element is disposed corresponding to the first display area S21 under the display panel. In an embodiment, the first display area S1 corresponds to a camera area. The first display area segment S21 corresponds to an area where other photosensitive elements, such as face identification (Face ID) have a lower requirement for incident light than cameras, are located. In this way, light transmittance in the first display area segment S21 may be lower than that of the first display area S1. In addition, the light diffraction phenomenon has a relatively small effect on the face recognition result. Therefore, the second light-emitting element P2 in the first display area segment S21 may keep the same area and polygonal shape as the second light-emitting element P2 in the second display area segment S22 and does not need to be adjusted as a circle or a nearly-circle to improve the diffraction.

Illustratively, in this embodiment, a pixel circuit driving the first light-emitting element P1 to emit light is referred to as a first pixel circuit C1, and a pixel circuit driving the second light-emitting element P2 to emit light is referred to as a second pixel circuit C2 to show differentiation. Exemplarily, the first pixel circuit C1 and the second pixel circuit C2 may be pixel circuits composed of a thin film transistor and a storage capacitor, such as a 7T1C (T denotes the thin film transistor, and C denotes the capacitor) pixel circuit commonly used in the art. This embodiment of the present application is not limited thereto.

In the embodiment of the present application, the first pixel circuit C1 corresponding to the first light-emitting element P1 and the second pixel circuit C2 corresponding to the second light-emitting element P2 are both disposed in the second display area S2 so that the first light-emitting element P1 is disposed in the first display area S1 but the first pixel circuit C1 is not disposed in the first display area S1, thereby guaranteeing a light transmittance requirement of the first display area S1.

Further, since the second display area S2 has sufficient space, it is possible to compress the size of at least part of the pixel circuits (at least one of the first pixel circuit C1 or the second pixel circuit C2) to dispose both the first pixel circuit C1 and the second pixel circuit C2 in the second display area S2 while ensuring that the first pixel circuits C1 are in a one-to-one correspondence electrically connected to the first light-emitting elements P1 and the second pixel circuits C2 are in a one-to-one correspondence electrically connected to the second light-emitting elements P2, achieving one-to-one driving of the pixel circuit to the light-emitting element. In this way, in the case where the first pixel circuit C1 and the second pixel circuit C2 have the same driving capability, compared with one first pixel circuit C1 driving multiple first light-emitting elements P1 to emit light, the one-to-one driving facilitates improving the luminous brightness of the first light-emitting element P1, ensuring that the actual luminous brightness of the first light-emitting element P1 reaches expected brightness, and improving the display effect of the first display area S1. In addition, in the case of ensuring the luminous brightness of each light-emitting element, if one pixel circuit drives multiple light-emitting elements to emit light, it is needed to improve the driving capability of the pixel circuit. In contrast, in the embodiment of the present application, the first pixel circuits C1 are in a one-to-one correspondence electrically connected to the first light-emitting elements P1, and the second pixel circuits C2 are in a one-to-one correspondence electrically connected to the second light-emitting elements P2, facilitating reducing the requirement for the driving capability of the pixel circuit, and prolonging the service life of components and parts in the pixel circuit. In addition, the one-to-one driving of the pixel circuit to the light-emitting element facilitates more flexibly and independently adjusting the luminous brightness of each light-emitting element, improving the display effect.

In this embodiment, since the first pixel circuits C1 are in a one-to-one correspondence electrically connected to the first light-emitting elements P1, the second pixel circuits C2 are in a one-to-one correspondence electrically connected to the second light-emitting elements P2, and the first light-emitting elements P1 and the second light-emitting elements P2 have the same distribution density, the first display area S1 and the second display area S2 can have the same display PPI, effectively improving the display effect of the first display area S1. Illustratively, when the first light-emitting elements P1 and the second light-emitting elements P2 have the same distribution density, if one first pixel circuit C1 drives multiple first light-emitting elements P1 at the same time, while one second pixel circuit C2 drives one second light-emitting element P2, in the case where the first pixel circuit C1 and the second pixel circuit C2 have the same driving capability, the luminous brightness of the multiple first light-emitting elements P1 in the first display area S1 is only equal to the luminous brightness of the one second light-emitting element P2 in the second display area S2, causing the actual number of display pixels per inch in the first display area S1 to be lower than the actual number of display pixels per inch in the second display area S2, and causing the display effect of the first display area S1 to be poor. In contrast, in the embodiment of the present application, the first pixel circuits C1 are in a one-to-one correspondence electrically connected to the first light-emitting elements P1, the second pixel circuits C2 are in a one-to-one correspondence electrically connected to the second light-emitting elements P2, and the first light-emitting elements P1 and the second light-emitting elements P2 have the same distribution density so that display pixels per inch in the first display area S1 is consistent with display pixels per inch in the second display area S2, making the first display area S1 and the second display area S2 have the same display PPI, and effectively improving the display effect of the first display area.

Exemplarily, it is possible to reduce a line width, a line distance, and the like in the pixel circuit to compress the size of the pixel circuit. Illustratively, the display panel includes multiple scanning lines and multiple data lines. The extension direction of a scanning line intersects the extension direction of a data line. The scanning line is overlapped and electrically connected to a setting area of the pixel circuits, and the data line is overlapped and electrically connected to the setting area of the pixel circuits. It is possible to compress at least one of the length of the pixel circuit in the extension direction of the scanning line or the length of the pixel circuit in the extension direction of the data line to compress the size of the pixel circuit. For example, it is possible to compress at least one of the width of the scan line in the extension direction of the data line or the distance between two adjacent scan lines in the extension direction of the data line to compress the length of the pixel circuit in the extension direction of the data line. For another example, it is possible to compress at least one of the width of the data line, the width of a power VDD (PVDD) signal line in the extension direction of the scan line, the distance between at least one pair of two adjacent data lines, two adjacent PVDD power signal lines, and adjacent data line and the PVDD power signal line in the extension direction of the scan line to compress the length of the pixel circuit in the extension direction of the scan line.

As shown in FIG. 3, the first light-emitting element P1 and the corresponding first pixel circuit C1 are located in different areas and can be electrically connected through a connection line 8. Illustratively, the light-emitting element (the first light-emitting element P1/the second light-emitting element P2) and the pixel circuit (the first pixel circuit C1/the second pixel circuit C2) which are overlapping two ends of one connection line 8 denote the light-emitting element and the pixel circuit to which the one connection line is connected (similarly hereinafter). For example, in FIG. 3, the first light-emitting element P1-1 is electrically connected to the first pixel circuit C1-1 through the connection line 8. In addition, since the area of the first display area S1 is much smaller than the area of the second display area S2, it is possible to adjust the area and position of a part of the second pixel circuits C2 to dispose the first pixel circuit C1 in the second display area S2. In this case, the relative positional relationship between part of the second light-emitting elements P2 and the corresponding second pixel circuits C2 is not adjusted, and the part of the second light-emitting elements P2 and the corresponding second pixel circuits C2 still overlap in a direction perpendicular to the plane where the display panel is located so that the part of the second light-emitting elements P2 and the corresponding second pixel circuits C2 are electrically connected through vias. For this, in FIG. 3, one second light-emitting element P2 overlapping one second pixel circuit C2, and both the one second light-emitting element P2 and the one second pixel circuit C2 overlapping one solid dot denote that the second light-emitting element P2 is electrically connected to the second pixel circuit C2 (similarly hereinafter). For example, in FIG. 3, the second light-emitting element P2-1 overlapping the second pixel circuit C2-1, and both the second light-emitting element P2-1 and the second pixel circuit C2-1 overlapping one solid dot denoting that the second light-emitting element P2-1 is electrically connected to the second pixel circuit C2-1.

It should be noted that the distribution manners of the first pixel circuits C1 and the second pixel circuits C2 shown in FIG. 3 are merely illustrative and not limiting. The first pixel circuit C1 and the second pixel circuit C2 may be distributed in the second display area S2 in any manner. This embodiment of the present application is not limited thereto and will be described by way of examples later. Moreover, one second light-emitting element P2 may also be electrically connected to at least one second pixel circuit C2 adjacent to the one second light-emitting element P2 but not electrically connected to the one second light-emitting element P2.

In summary, in the embodiment of the present application, the display panel includes the first display area and the second display area. The first display area includes multiple first light-emitting elements. The second display area includes multiple second light-emitting elements, multiple first pixel circuits, and multiple second pixel circuits. The multiple first light-emitting elements and the multiple second light-emitting elements have the same distribution density. The multiple first pixel circuits are in a one-to-one correspondence electrically connected to the multiple first light-emitting elements. The multiple second pixel circuits are in a one-to-one correspondence electrically connected to the multiple second light-emitting elements. In this manner, since the first light-emitting elements are disposed only in the first display area, the requirement of the first display area for the light transmittance can be ensured. Since the second display area has more sufficient space, it is possible to compress the size of at least part of the pixel circuits to dispose the first pixel circuits corresponding to the first light-emitting elements in the first display area and the second pixel circuits corresponding to the second light-emitting elements in the second display area in the second display area, thereby achieving that one first pixel circuit drives one first light-emitting element, and one second pixel circuit drives one second light-emitting element. Moreover, since the first light-emitting elements and the second light-emitting elements have the same distribution density, the first display area and the second display area can have the same display PPI, thereby improving the display effect of the first display area.

Figure 6:
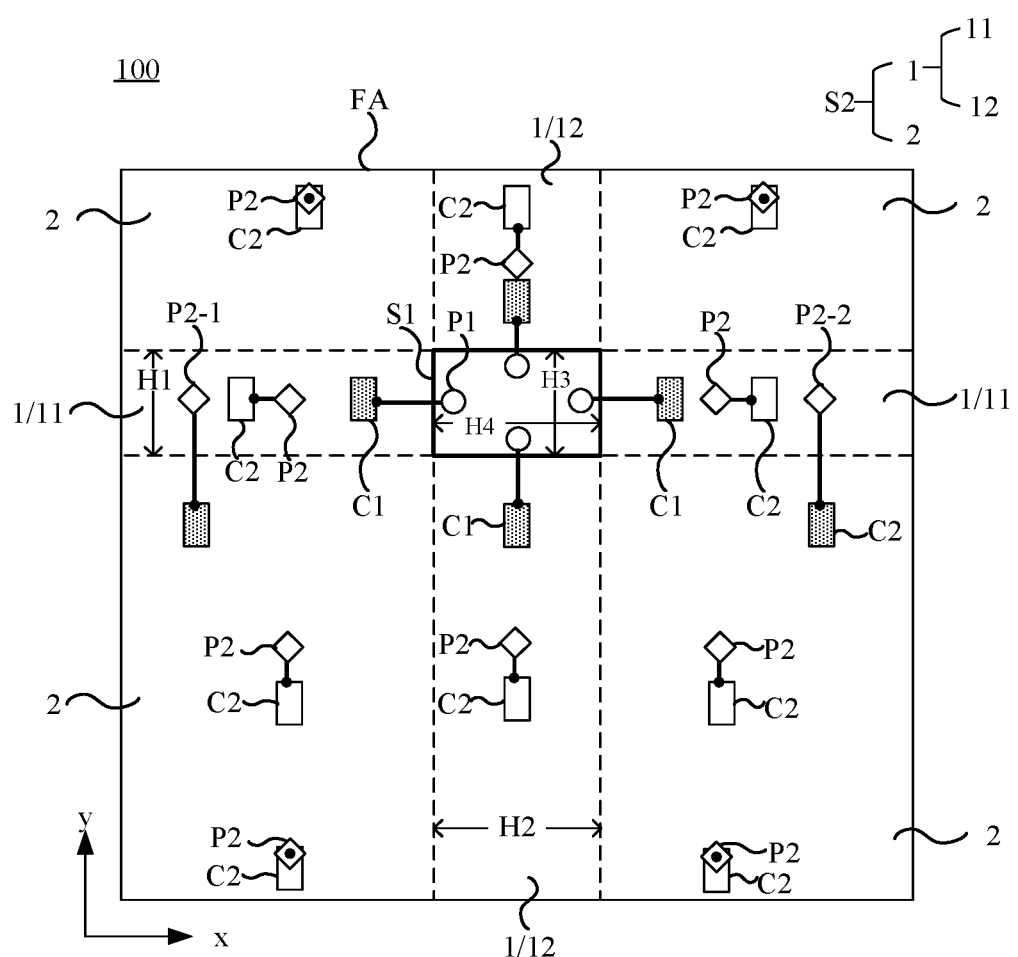
FIG. 6 is a structural diagram of another display panel according to an embodiment of the present application.

On the basis of the preceding embodiments, FIG. 6 is a structural diagram of another display panel according to an embodiment of the present application. As shown in FIG. 6, illustratively, the second display area S2 includes a first display sub-area 1 and a second display sub-area 2. The first display sub-area 1 is adjacent to the first display area S1. The second display sub-area 2 is adjacent to the first display sub-area 1. At least one second pixel circuit C2 of the multiple second pixel circuits C2 corresponding to at least one second light-emitting element P2 (e.g. the second light-emitting element P2-1 and the second light-emitting element P2-2 in FIG. 6) of the multiple second light-emitting elements P2 in the first display sub-area 1 is located in the second display sub-area 2.

It should be noted that FIG. 6 uses an example where the first light-emitting element P1 is circular, and the second light-emitting element P2 is rhombic to show part of the first light-emitting elements P1 and part of the second light-emitting elements P2, and illustrate the electrical connection relationship between the first light-emitting element P1 and the first pixel circuit C1, the electrical connection relationship between the second light-emitting element P2 and the second pixel circuit C2, and the area where the first pixel circuit C1 is located and the area where the second pixel circuit C2 is located. The arrangement manners of the first light-emitting elements P1 and the second light-emitting elements P2 and the arrangement manners of the first pixel circuits C1 and the second pixel circuits C2 in FIG. 6 are not intended to limit the actual arrangement manners.

Figure 7:
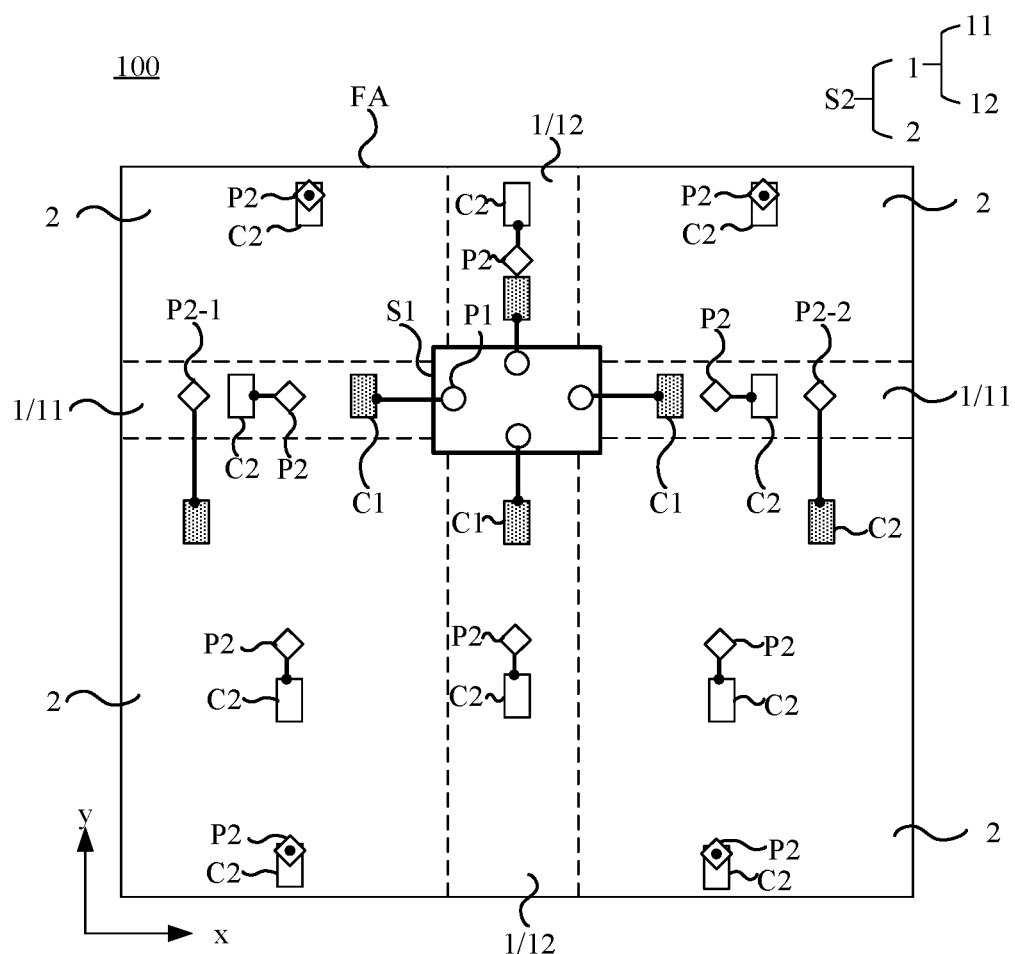
FIG. 7 is a structural diagram of another display panel according to an embodiment of the present application.

Illustratively, the first display sub-area 1 may be adjacent to at least part of the boundary of the first display area S1. FIG. 6 illustrates using an example where the first display sub-area 1 is adjacent to the entire boundary of the first display sub-area S1. In this case, the first display area S1 is only adjacent to the first display sub-area 1, and the second display sub-area 2 is only adjacent to the first display sub-area 1. FIG. 7 is a structural diagram of another display panel according to an embodiment of the present application. As shown in FIG. 7, in other embodiments, the first display sub-area 1 may be adjacent to part of the boundary of the first display area S1, and the second display sub-area 2 may also be adjacent to the first display area S1.

Referring to FIG. 3, if the first pixel circuit C1 is disposed only in the second display area S2, for example, the first pixel circuit C1 is disposed in the first display sub-area 1 adjacent to the first display area S1 and below the first display area S1, making pixel circuits corresponding to light-emitting elements in the same row (the first light-emitting elements P1 and the second light-emitting elements P2 in the same row, or the second light-emitting elements P2 in the same row) misaligned in a second direction y and more dispersed in the display panel. In this case, a scanning line Gate needs to be wound so that one scanning line is electrically connected to the pixel circuits corresponding to the light-emitting elements in the same row to transmit scanning signals to the pixel circuits corresponding to the light-emitting elements in the same row through the scanning lines during the display driving process, thereby lighting the light-emitting elements in the same row at the same time. Similarly, it is to be understood that if the first pixel circuit C1 is disposed in the first display sub-area 1 adjacent to the first display area S1 in a first direction x, the data line needs to be wound to transmit data signals to pixel circuits corresponding to light-emitting elements in the same column through the data line during the display driving process. In this embodiment, compared with disposing the first pixel circuit C1 only in second display area S2, the second pixel circuit C2 corresponding to at least one second light-emitting element P2 in the first display sub-area 1 adjacent to the first display area S1 is externally disposed in the second display sub-area 2, thereby reducing the scattering degree of the pixel circuits corresponding to the light-emitting elements in the same row or column in the display panel, reducing the winding degree or avoiding the winding of the signal lines (e.g. the scanning line and the data line), and reducing the difficulty in setting the signal lines. In addition, in one embodiment, the second pixel circuit C2 corresponding to the at least one second light-emitting element P2 in the first display sub-area 1 is disposed in the second display sub-area 2 so that an area corresponding to the second light-emitting element P2 can be multiplexed into the first display area segment S21 so that this area can be used to achieve functions such as face recognition and the like, enriching the function diversity of the display device.

Figure 8:
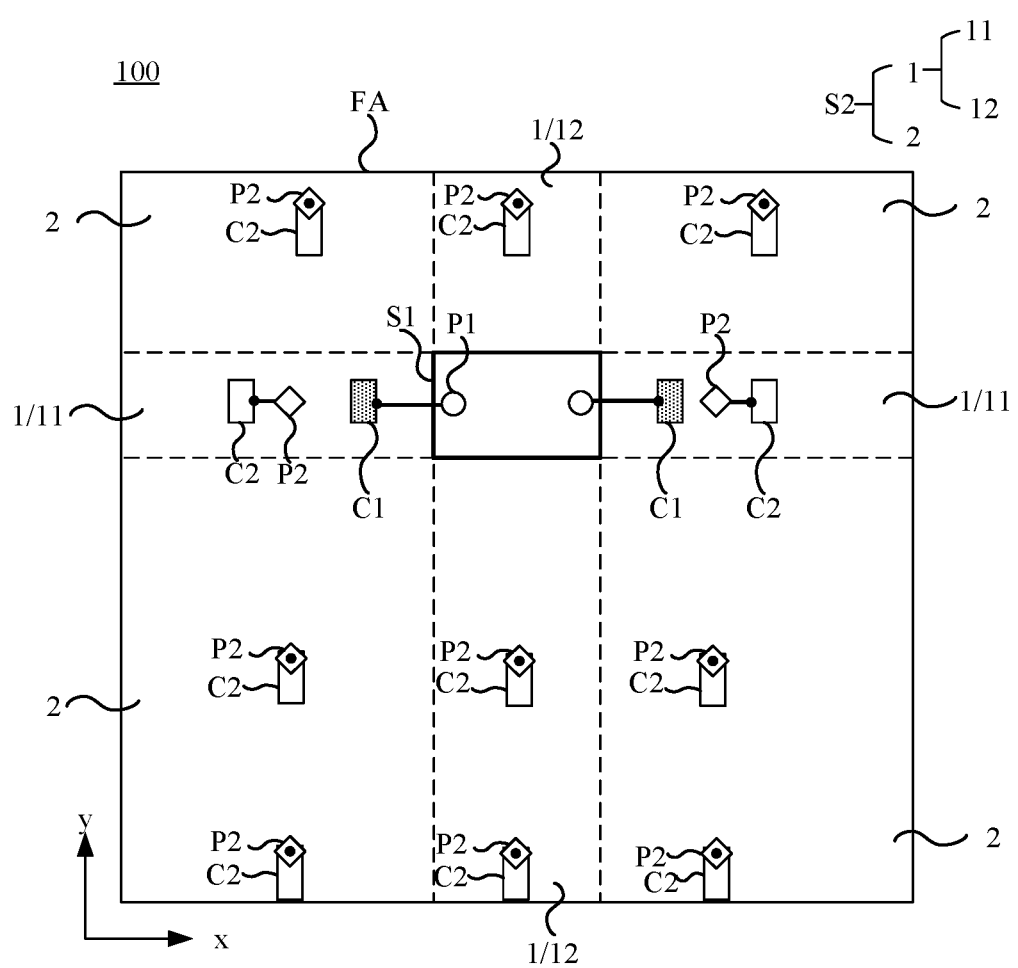
FIG. 8 is a structural diagram of another display panel according to an embodiment of the present application.

FIG. 8 is a structural diagram of another display panel according to an embodiment of the present application. As shown in FIG. 8, illustratively, the first display sub-area 1 includes a first sub-region 11 and a second sub-region 12. The first sub-region 11 and the first display area S1 are adjacent in a first direction x. The second sub-region 12 and the first display area S1 are adjacent in a second direction y. The first direction x intersects the second direction y. The multiple first pixel circuits C1 are located in at least one of the first sub-region 11 or the second sub-region 12.

Illustratively, the first direction x and the second direction y are orthogonal, and such arrangement facilitates reducing the difficulty in rearranging the first pixel circuits C1 and the second pixel circuits C2. It should be noted that FIG. 8 illustrates using an example where the first direction x is a row direction, and the second direction y is a column direction. In other embodiments, the example may also be that the first direction x is a column direction, and the second direction y is a row direction. This embodiment of the present application is not limited thereto. Exemplarily, the row direction may be consistent with the extension direction of the scan line. Correspondingly, the column direction may be consistent with the extension direction of the data line.

The following illustrates using the example where the first direction x is the row direction, and the second direction y is the column direction.

Illustratively, according to the position of the first display area S1 in the total display area FA of the display panel, the first sub-display area 1 may include at least one first sub-region 11 and at least one second sub-region 12. Exemplarily, in FIG. 8, the first display area S1 is located inside the total display area FA of the display panel. In this case, the first display sub-area 1 includes two first sub-regions 11 located on two opposite sides of the first display area S1 in the first direction x, and two second sub-regions 12 located on two opposite sides of the first display area S1 in the second direction y. Such arrangement manner is merely illustrative and not limiting. Exemplarily, in other embodiments, the first display sub-area 1 may include two first sub-regions 11 adjacent to the first display area S1 in the first direction x and one second sub-region 12 adjacent to the first display area S1 in the second direction y.

Illustratively, it is possible to dispose all first pixel circuits C1 in the first sub-region 11. It is also possible to dispose all first pixel circuits C1 in the second sub-region 12. It is also possible to dispose part of the first pixel circuits C1 in the first sub-region 11 and another part of the first pixel circuits C1 in the second sub-region 12. This embodiment of the present application is not limited thereto.

Figure 9:
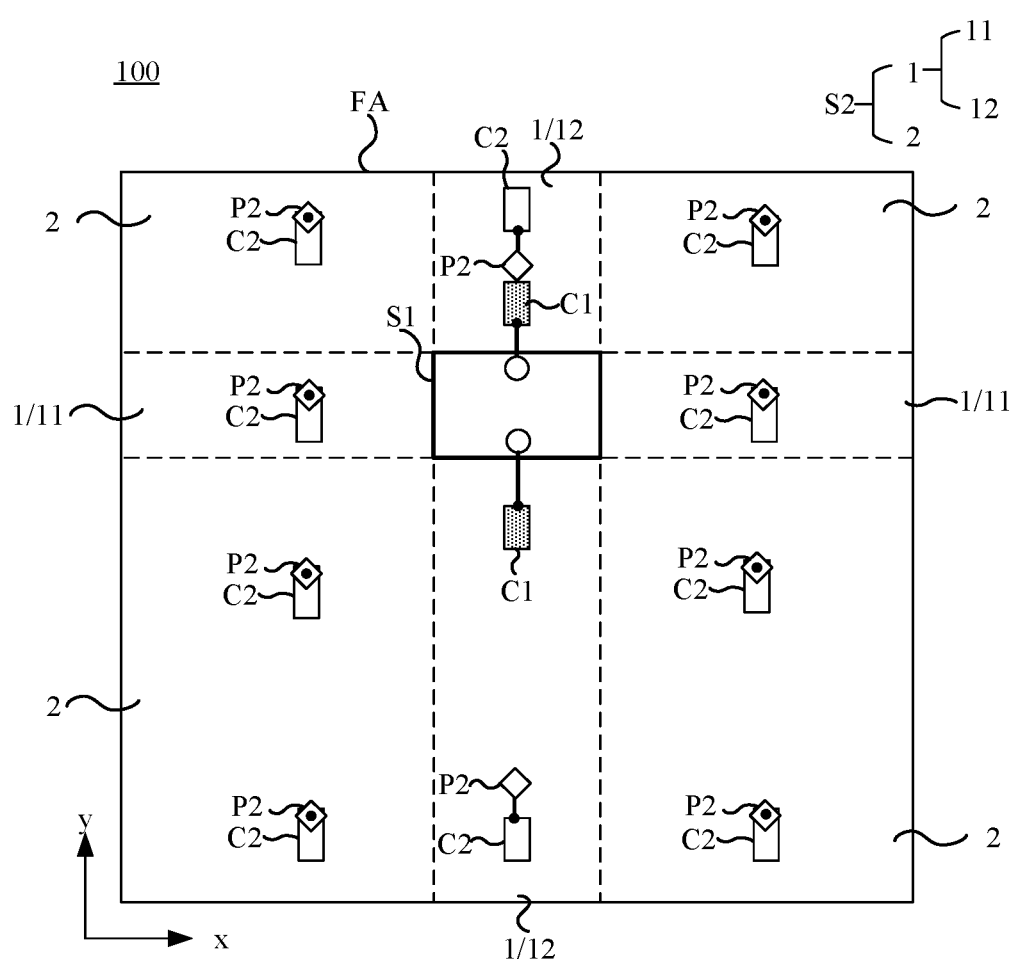
FIG. 9 is a structural diagram of another display panel according to an embodiment of the present application.

Exemplarily, FIG. 8 illustrates using an example where the first pixel circuits C1 are all located in the first sub-region 11. In addition, FIG. 9 is a structural diagram of another display panel according to an embodiment of the present application. As shown in FIG. 9, in other embodiments, all first pixel circuits C1 may be disposed in the second sub-region 12. In another embodiment, referring to FIG. 6, multiple first pixel circuits C1 may be disposed in the first sub-region 11 and the second sub-region 12, separately. In the embodiment of the present application, the first pixel circuits C1 are disposed in at least one of the first sub-region 11 or the second sub-region 12 adjacent to the first display area S1, thereby facilitating reducing the connection difficulty between the first pixel circuit C1 and the first light-emitting element P1 and the wiring difficulty in the display panel, and reducing the influence on the product yield.

It should be noted that when the number of first sub-regions 11 is two, the first pixel circuits C1 may be disposed in at least one of the first sub-regions 11 according to requirements. Similarly, when the number of second sub-regions 12 is two, the first pixel circuits C1 may be disposed in at least one of the second sub-regions 12 according to requirements. This embodiment of the present application is not limited thereto.

It should also be noted that when the first pixel circuits C1 are located in at least one of the first sub-region 11 or the second sub-region 12, whether or not to dispose the at least one of second pixel circuit C2 corresponding to the at least one second light-emitting element P2 in at least one of the first sub-region 11 or the second sub-region 12 (i.e. the first display sub-area 1) in the second display sub-area 2 may be determined according to actual requirements. This embodiment of the present application is not limited thereto. FIG. 8 illustrates an example where the second pixel circuits C2 corresponding to the second light-emitting elements P2 in the first sub-region 11 are still located in the first sub-region 11. FIG. 9 illustrates an example where the second pixel circuits C2 corresponding to the second light-emitting elements P2 in the second sub-region 12 are still located in the second sub-region 12. In other embodiments, referring to FIG. 6, the at least one second pixel circuit C2 corresponding to the at least one second light-emitting element P2 in at least one of the first sub-region 11 or the second sub-region 12 is disposed in the second display sub-area 2.

Referring to FIG. 6, illustratively, the maximum width H4 of the first display area S1 in the first direction x is equal to the maximum width H2 of the second sub-region 12 in the first direction x. The maximum width H3 of the first display area S1 in the second direction y is equal to the maximum width H1 of the first sub-region 11 in the second direction y. Such arrangement can dispose the first pixel circuit C1 in at least one of the first sub-region 11 or the second sub-region 12 by translating and compressing the size of at least one of the first pixel circuit C1 or the second pixel circuit C2, thereby facilitating reducing the layout difficulty of the pixel circuit, the wiring difficulty of the display panel, and the influence on the product yield.

Figure 10:
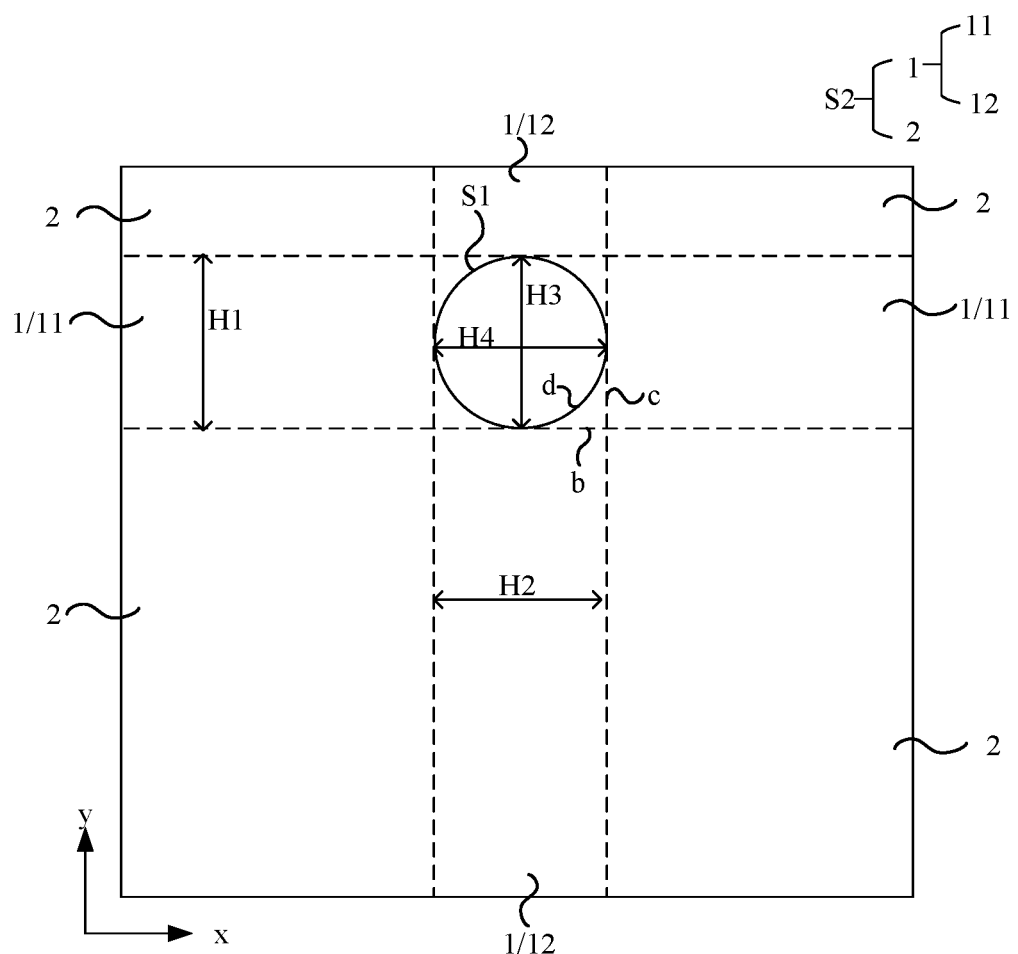
FIG. 10 is a structural diagram of another display panel according to an embodiment of the present application.

It should be noted that FIG. 6 illustrates using an example where the first display area S1 is rectangular. The shape of the first display area S1 is illustrative and not limiting. FIG. 10 is a structural diagram of another display panel according to an embodiment of the present application. As shown in FIG. 10, in other embodiments, the first display area S1 may also be circular. Of course, the first display area S1 may be any other shape known to those skilled in the art, and this embodiment of the present application is not limited thereto.

As shown in FIG. 10, when the first display area S1 is circular, the first display sub-area 1 may also include a first sub-region 11 and a second sub-region 12. The first sub-region 11 and the first display area S1 are adjacent in a first direction x. The second sub-region 12 and the first display area S1 are adjacent in a second direction y. The maximum width H4 of the first display area S1 in the first direction x is equal to the maximum width H2 of the second sub-region 12 in the first direction x. The maximum width H3 of the first display area S1 in the second direction y is equal to the maximum width H1 of the first sub-region 11 in the second direction y.

It should be noted that the implementation shown in FIG. 10 is different from that in FIG. 6 in that: since the first display area S1 is circular, when the maximum width H4 of the first display area S1 in the first direction x is equal to the maximum width H2 of the second sub-region 12 in the first direction x, and the maximum width H3 of the first display area S1 in the second direction y is equal to the maximum width H1 of the first sub-region 11 in the second direction y, the first sub-region 11 and the second sub-region 12 have overlapping areas. For example, in FIG. 10, the triangular-like area surrounding by the dotted line b, the dotted line c, and the outer boundary d of the first display area S1 is an overlapping area between the first sub-region 11 on the right side of the first display area S1 and the second sub-region 12 below the first display area S1. To reduce the layout difficulty of the pixel circuit, when the first display area S1 is circular, the second pixel circuits C2 corresponding to the second light-emitting elements P2 in the overlapping areas of the first sub-region 11 and the second sub-region 12 may be moved to at least one of the first sub-region 11 or the second sub-region 12 outside the overlapping area along with the first pixel circuits C1.

Figure 11:
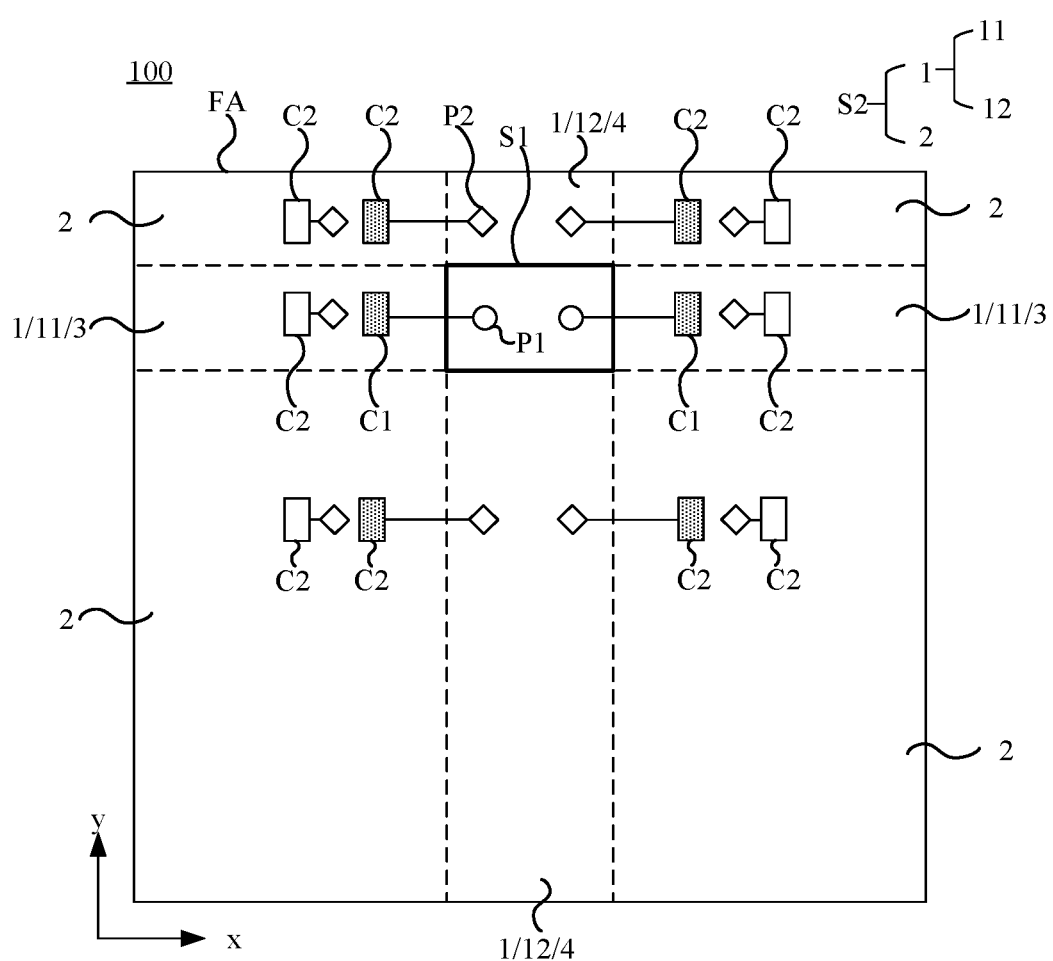
FIG. 11 is a structural diagram of another display panel according to an embodiment of the present application.
Figure 12:
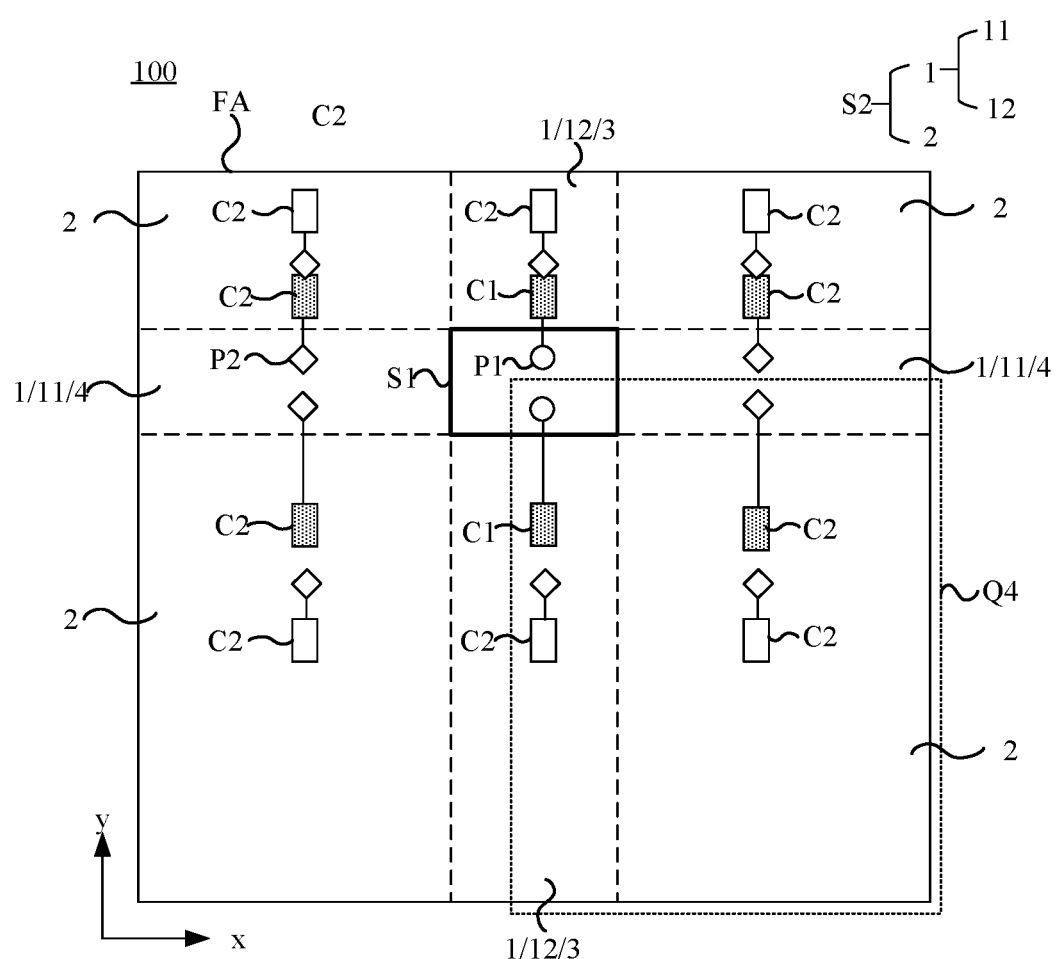
FIG. 12 is a structural diagram of another display panel according to an embodiment of the present application.

FIG. 11 is a structural diagram of another display panel according to an embodiment of the present application. FIG. 12 is a structural diagram of another display panel according to an embodiment of the present application. As shown in FIGS. 11 and 12, when the first display sub-area 1 includes a first sub-region 11 and a second sub-region 12, the multiple first pixel circuits C1 are located in at least one of the first sub-region 11 or the second sub-region 12, and the at least one second pixel circuit C2 corresponding to the at least one second light-emitting element P2 in the first display sub-area 1 is located in the second display sub-area 2, Illustratively, the first pixel circuits C1 are located in a first area 3, the second pixel circuit C2 corresponding to the at least one second light-emitting element P2 in a second area 4 is located in the second display sub-area 2. The first area 3 is one of the first sub-region 11 or the second sub-region 12. The second area 4 is the other of the first sub-region 11 or the second sub-region 12. Exemplarily, FIG. 11 illustrates using an example where the first area 3 is the first sub-region 11, and the second area 4 is the second sub-region 12. As shown in FIG. 11, in one embodiment, the first pixel circuits C1 are located in the first sub-region 11, and the second pixel circuits C2 corresponding to the second light-emitting elements P2 in the second sub-region 12 are located in the second display sub-area 2. Such arrangement makes the first pixel circuits C1 corresponding to the first light-emitting elements P1 in the first display area S1 and the second pixel circuits C2 corresponding to the second light-emitting elements P2 in the second sub-region 12 adjacent to the first display area S1 in the second direction y, being located in the first sub-region 11 and the second display sub-area 2 adjacent to the first sub-region 11 in the second direction y, respectively. This manner facilitates reducing the scattering degree in the first direction x of the pixel circuits corresponding to the light-emitting elements in the same column in the second direction y and even making the pixel circuits which are corresponding to the light-emitting elements in the same column being located in the same column, thereby reducing the winding of the data line, and reducing the wiring difficulty. Moreover, since no pixel circuit is disposed in the first display area S1 and the second sub-region 12, the winding of the data line in a frame area around the first display area S1 can be avoided, thereby reducing the frame width, and improving the display effect.

It should be noted that FIG. 11 illustrates an example where the first light-emitting element P1 is circular, and the second light-emitting element P2 is rhombic, filled rectangles denote the second pixel circuits C2 corresponding to the second light-emitting elements P2 in the second sub-region 12, and unfilled rectangles denote the original second pixel circuits C2 in the first sub-region 11 and the second sub-area 2. In addition, to illustrate the position movement of the first pixel circuits C1, rectangles denoting the first pixel circuits C1 are also filled. The second pixel circuits corresponding to the second light-emitting elements in different areas are distinguished in the same filling manner.

Exemplarily, FIG. 12 illustrates an example where the first area 3 is the second sub-region 12 and the second area 4 is the first sub-region 11. As shown in FIG. 12, in another embodiment, the first pixel circuits C1 are located in the second sub-region 12, and the second pixel circuits C2 corresponding to the second light-emitting elements P2 in the first sub-region 11 are located in the second display sub-area 2. Such arrangement makes the first pixel circuits C1 corresponding to the first light-emitting elements P1 in the first display area S1 and the second pixel circuits C2 corresponding to the second light-emitting elements P2 in the first sub-region 11 adjacent to the first display area S1 in the first direction x, being located in the second sub-region 12 and the second display sub-area 2 adjacent to the second sub-region 12 in the first direction x, respectively. This manner facilitates reducing the scattering degree in the second direction y of the pixel circuits corresponding to the light-emitting elements in the same row in the first direction x, and even making the pixel circuits corresponding to the light-emitting elements in the same row located in the same row, thereby reducing the winding of the data line, and reducing the wiring difficulty. Moreover, since no pixel circuit is disposed in the first display area S1 and the first sub-region 11, the winding of the data line in a frame area around the first display area S1 can be avoided, thereby reducing the frame width, and improving the display effect.

It should be noted that FIG. 12 illustrates an example where the first light-emitting element P1 is circular, and the second light-emitting element P2 rhombic, filled rectangles denote the second pixel circuits C2 corresponding to the second light-emitting elements P2 in the first sub-region 11, and unfilled rectangles denote the original second pixel circuits C2 in the second sub-region 12 and the second sub-area 2. In addition, to illustrate the position movement of the first pixel circuits C1, rectangles denoting the first pixel circuits C1 are also filled. The second pixel circuits corresponding to the second light-emitting elements in different areas are distinguished in the same filling manner.

It should also be noted that FIG. 12 illustrates an example where all first pixel circuits C1 are located in the second sub-region 12 below the first display area S1, and all second pixel circuits C2 corresponding to the second light-emitting elements P2 in the first sub-region 11 are located in the second sub-area 2 below the first sub-region 11, and this arrangement manner is not limiting. Exemplarily, in other embodiments, it is possible to dispose part of the first pixel circuits C1 in the second sub-region 12 above the first display area S1, and dispose another part of the first pixel circuits C1 in the second sub-region 12 below the first display area S1. The second pixel circuits C2 corresponding to the second light-emitting elements P2 in the first sub-region 11 may be disposed in the second display sub-area 2 above the first sub-region 11 and in the second display sub-area 2 below the first sub-region 11.

Since the first sub-region 11 is adjacent to the first display area S1 in the first direction x and the second sub-region 12 is adjacent to the first display area S1 in the second direction y, the first pixel circuits C1 are disposed in the first area 3 (e.g. the first sub-region 11), and the second pixel circuits C2 corresponding to the second light-emitting elements P2 in the second area 4 (e.g. the second sub-region 12) are disposed in the second display sub-area 2, making the first pixel circuits corresponding to the first light-emitting elements P1 in the first display area S1 and the second pixel circuits C2 corresponding to the second light-emitting elements P2 in the second area 4 moved in the same direction into an area in the second display area S2 other than the second area 4, thereby facilitating reducing the layout difficulty of the pixel circuit, the scattering degree of the pixel circuits, and the wiring difficulty of the display panel.

Next, the layout of the first pixel circuits C1 and the second pixel circuits C2 in the second sub-region 12 and the second display sub-area 2 is exemplarily described using the example where the first area 3 is the second sub-region 12 and the second area 4 is the first sub-region 11.

Figure 13:
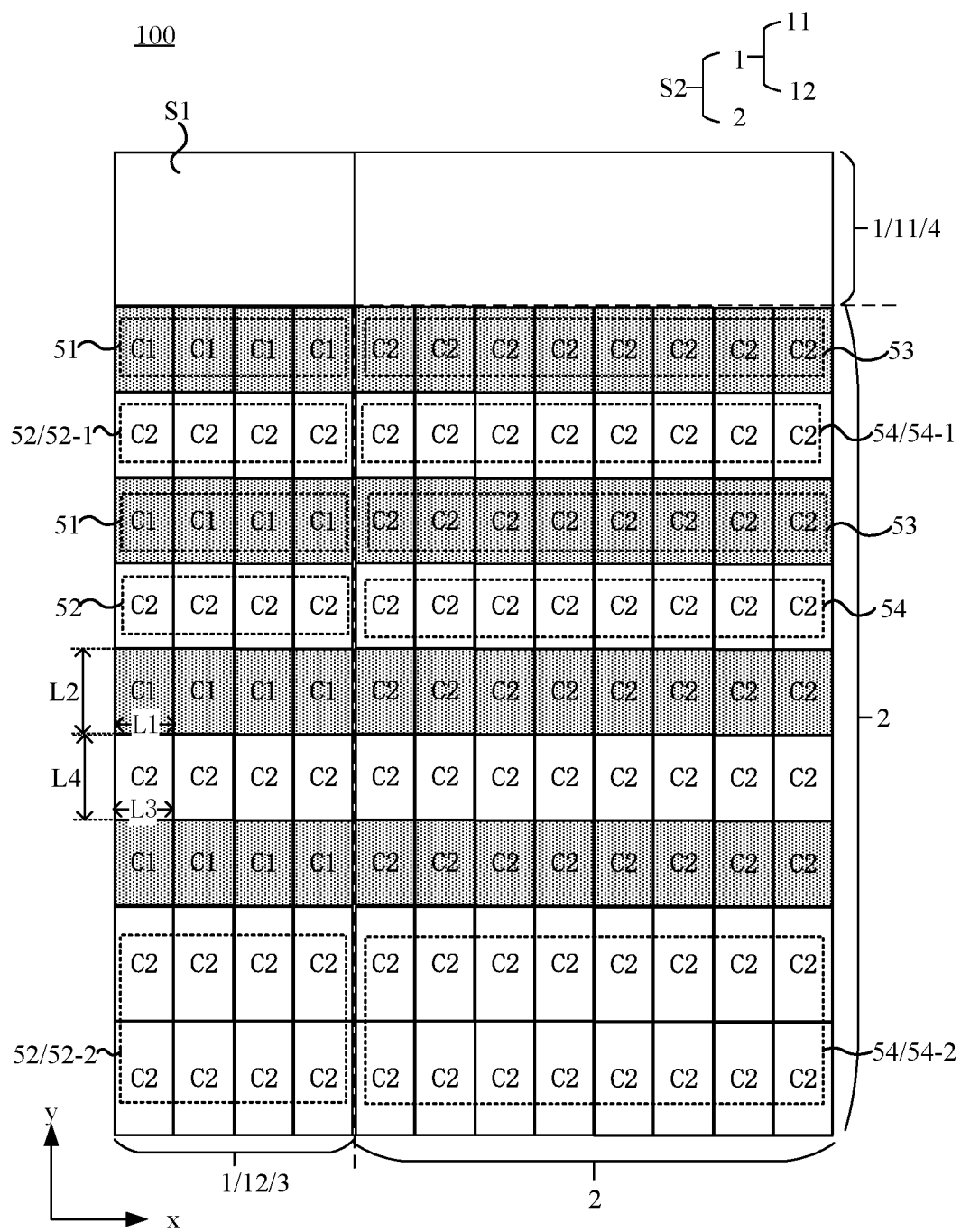
FIG. 13 is an enlarged structural diagram of a display panel corresponding to an area Q4 in FIG. 12.

FIG. 13 is an enlarged structural diagram of a display panel corresponding to an area Q4 in FIG. 12. As shown in FIG. 13, illustratively, the first area 3 includes at least one first circuit group 51 and at least one second circuit group 52. The at least one first circuit group 51 includes a first pixel circuit C1. The at least one second circuit group 52 includes at least one second pixel circuit C2. A first circuit group 51 of the at least one first circuit group 51 is located on one side of one second circuit group 52 adjacent to the first display area S1. The second display sub-area 2 includes at least one third circuit group 53 and at least one fourth circuit group 54.

The at least one third circuit group 53 includes at least one second pixel circuit C2 corresponding to at least one second light-emitting element P2 in the second area 4. The at least one fourth circuit group 54 includes second pixel circuits C2 in the second display sub-area 2 other than the at least one second pixel circuit C2 in the at least one third circuit group 53. A third circuit group 53 of the at least one third circuit group 53 is located on one side of one of one fourth circuit group 54 adjacent to the second area 4.

That the at least one first circuit group 51 includes the at least one first pixel circuit C1 specifically means that in particular, one first circuit group 51 may include one first pixel circuit C1, or at least two adjacent first pixel circuits C1. Similarly, that the at least one second circuit group 52 includes at least one second circuit C2 means that one second circuit group 52 may include one second pixel circuit C2 in the first area 3, or at least two adjacent second pixel circuits C2 in the first area 3. The third circuit group 53 and the fourth circuit group 54 may be understood with reference to the configuration of the first circuit group 51, and details are not repeated herein.

It should be noted that the sizes of the multiple first pixel circuits C1 in the same first circuit group 51 may be the same or different. The numbers of first pixel circuits C1 in different first circuit groups 51 may be the same or different. The sizes of the first pixel circuits C1 in different first circuit groups 51 may be the same or different. This embodiment of the present application is not limited thereto. Similarly, for the second circuit group 52, the third circuit group 53, and the fourth circuit group 54, the sizes of the multiple second pixel circuits C2 in the same circuit group (the second circuit group 52/the third circuit group 53/the fourth circuit group 54) may be the same or different. The numbers of second pixel circuits C2 in different circuit groups (the second circuit group 52/the third circuit group 53/the fourth circuit group 54) may be the same or different. The sizes of the second pixel circuits C2 in different circuit groups (the second circuit group 52/the third circuit group 53/the fourth circuit group 54) may be the same or different. This embodiment of the present application is not limited thereto.

Illustratively, the pixel circuits (at least one of the first pixel circuit C1 or the second pixel circuit C2) in the same row are equal in size in the column direction (e.g. the direction y), and the pixel circuits (at least one of the first pixel circuit C1 or the second pixel circuit C2) in the same column are equal in size in the row direction (e.g. x direction). Such arrangement facilitates setting the signal lines such as the scanning line and the data line, and reducing the winding and the difficulty in designing and manufacturing the display panel.

Exemplarily, FIG. 13 illustrates using an example where the first area 3 includes multiple first circuit groups 51 and multiple second circuit groups 52, and the second display sub-area 2 includes multiple third circuit groups 53 and multiple fourth circuit groups 54. Illustratively, referring to FIG. 13, multiple adjacent first pixel circuits C1 in the same row in the first area 3 may constitute one first circuit group 51. Multiple adjacent second pixel circuits C2 in the same row in the first area 3 may constitute one second circuit group 52 (e.g. 52-1). In addition, the second pixel circuits C2 in at least two adjacent rows in the first area 3 may also constitute one second circuit group 52 (e.g. 52-2). Multiple adjacent second pixel circuits C2 in the same row in the second display sub-area 2 and corresponding to the second light-emitting elements P2 in the second area 4 may constitute one third circuit group 53. In other second pixel circuits C2 in the second display sub-area 2, multiple adjacent second pixel circuits C2 in the same row may constitute one fourth circuit group 54 (e.g. 54-1). Moreover, the second pixel circuits C2 in at least two adjacent rows may constitute one fourth circuit group 54 (e.g. 54-2). FIG. 13 illustrates using an example where the first pixel circuits C1 are located in the second sub-region 12, and the second pixel circuits C2 corresponding to the second light-emitting elements P2 in the first sub-region 11 are located in the second display sub-area 2. In this case, the first circuit group 51 is constituted by the first pixel circuits C1 in the same row or several adjacent rows, and the second circuit group 52/the third circuit group 53/the fourth circuit group 54 is constituted by the second pixel circuits C2 in the same row or several adjacent rows so that the first light-emitting elements P1 in the same row correspond to the first pixel circuits C1 in the same row and/or the second light-emitting elements P2 in the same row correspond to the second pixel circuits C2 in the same row. Therefore, the positions and sizes of the pixel circuits need to be adjusted only in one direction (the second direction in FIG. 13), reducing the layout difficulty of the pixel circuits and the wiring difficulty of the display panel, and reducing the influence on the product yield.

Figure 14:
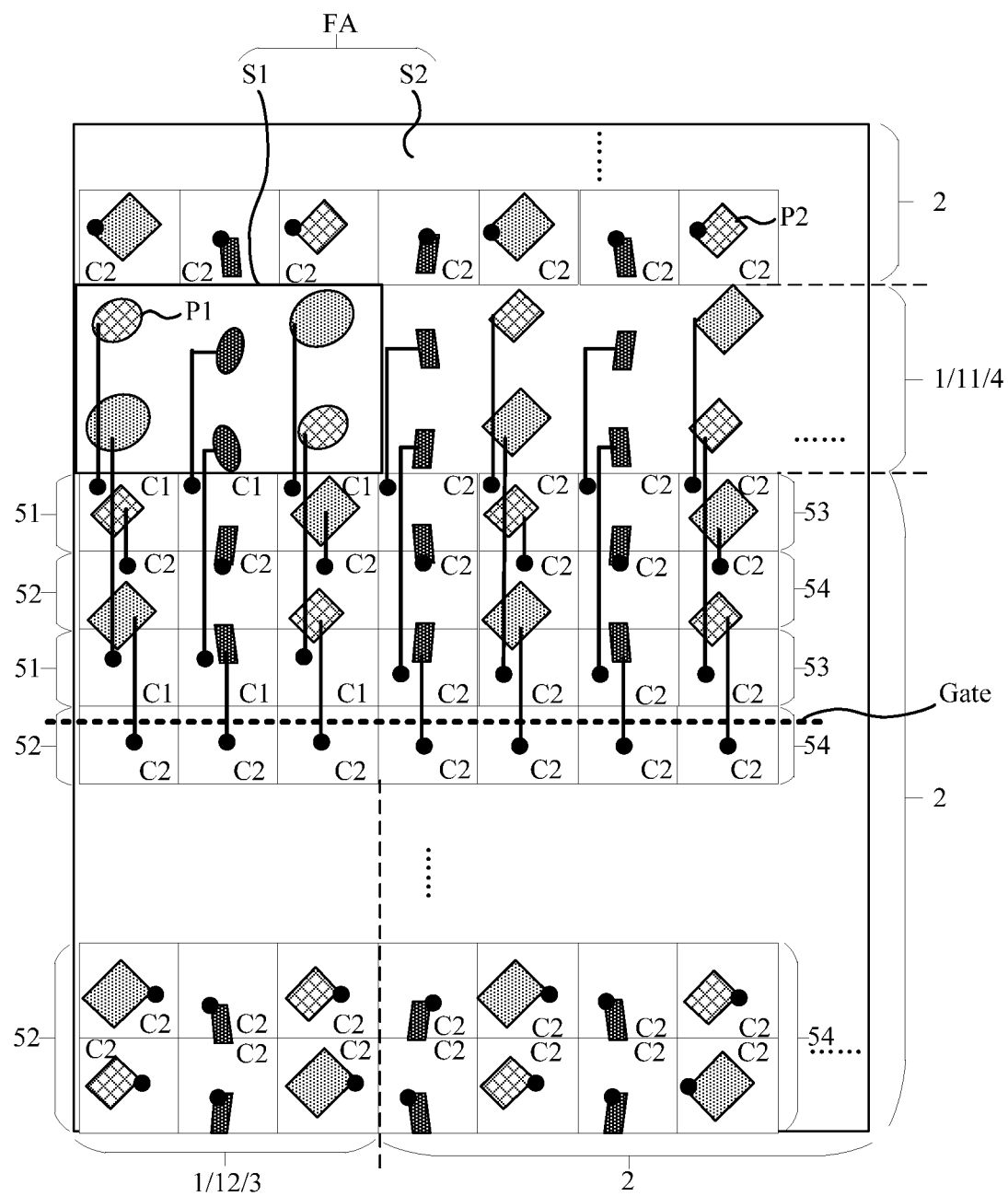
FIG. 14 is a partial structural diagram of a display panel according to an embodiment of the present application.

Exemplarily, FIG. 14 is a partial structural diagram of a display panel according to an embodiment of the present application. As shown in FIG. 14, the first pixel circuits C1 in the same row in the same first circuit group 51 are electrically connected to the first light-emitting elements P1 in the same row. The second pixel circuits C2 in the same row in the same second circuit group 52 are electrically connected to the second light-emitting elements P2 in the same row in the second sub-region 12. The second pixel circuits C2 in the same row in the same third circuit group 53 are electrically connected to the second light-emitting elements P2 in the same row in the first sub-region 11. The second pixel circuits C2 in the same row in the same fourth circuit group 54 are electrically connected to the second light-emitting elements P2 in the same row in the second display sub-area 2. Such arrangement can achieve that the pixel circuits (at least one of the first pixel circuits C1 or the second pixel circuits C2) corresponding to the light-emitting elements (at least one of the first light-emitting elements P1 or the second light-emitting elements P2) in the same row are located in the same row, thereby avoiding winding the scan line Gate, reducing the layout difficulty of the pixel circuits and the wiring difficulty of the display panel, and reducing the influence on the product yield.

Figure 15:
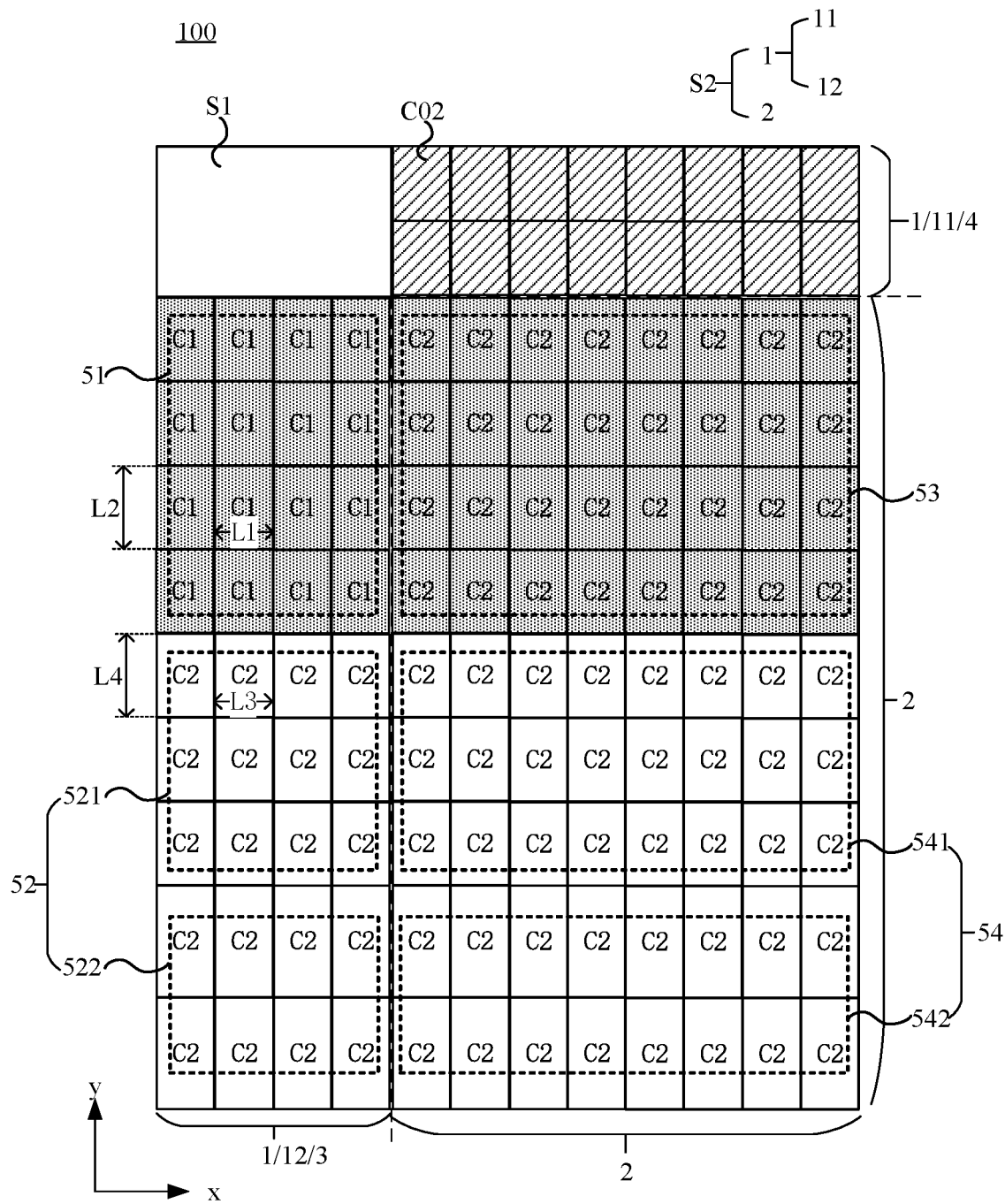
FIG. 15 is an enlarged structural diagram of another display panel corresponding to an area Q4 in FIG. 12.

It should be noted that FIG. 13 illustrates using an example where the first circuit groups 51 and the second circuit groups 52 are alternatively arranged in the first area 3, and the third circuit groups 53 and the fourth circuit groups 54 are alternatively arranged in the second display sub-area 2, and this arrangement is not limiting. FIG. 15 is an enlarged structural diagram of another display panel corresponding to an area Q4 in FIG. 12. As shown in FIG. 15, in other embodiments, the first area 3 (e.g. the second sub-region 12) adjacent to one side of the first display area S1 includes one first circuit group 51 and one second circuit group 52. The one first circuit group 51 is located on one side of the one second circuit group 52 adjacent to the first display area S1. Similarly, optionally, the second display sub-area 2 adjacent to one side of the second area 4 (e.g. the first sub-region 11) includes one third circuit group 53 and one fourth circuit group 54. The one third circuit group 53 is located on one side of the one fourth circuit group 54 adjacent to the second area 4. Such arrangement can make the first pixel circuits C1 and the first light-emitting elements P1 disposed proximately, and the second pixel circuit C2 in the third circuit group 53 and the second light-emitting element P2 in the second area 4 disposed proximately, thereby facilitating electrically connecting the first pixel circuit C1 to the first light-emitting element P1, and electrically connecting the second pixel circuit C2 in the third circuit group 53 to the second light-emitting element P2 in the second area 4, reducing the wiring difficulty.

Referring to FIG. 13, illustratively, the size of the first pixel circuit C1 is equal to the size of the second pixel circuit C2 in the third circuit group 53. The size of the first pixel circuit C1 is equal to the size of at least one second pixel circuit C2 in the second circuit group 52. The size of the second pixel circuit C2 in the third circuit group 53 is equal to the size of at least one second pixel circuit C2 in the fourth circuit group 54.

The size of the first pixel circuit C1 includes a first side length L1 in the first direction x of an area where the first pixel circuit C1 is located and a second side length L2 in the second direction y of the area where the first pixel circuit C1 is located. The size of the second pixel circuit C2 includes a third side length L3 in the first direction x of an area where the second pixel circuit C2 is located and a fourth side length L4 in the second direction y of the area where the second pixel circuit C2 is located. If the first side length L1 corresponding to the first pixel circuit C1 is equal to the third side length L3 corresponding to the second pixel circuit C2, and the second side length L2 corresponding to the first pixel circuit C1 is equal to the fourth side length L4 corresponding to the second pixel circuit C2, the size of the first pixel circuit C1 is equal to the size of the second pixel circuit C2. Otherwise, if the first side length L1 corresponding to the first pixel circuit C1 is not equal to the third side length L3 corresponding to the second pixel circuit C2, and/or the second side length L2 corresponding to the first pixel circuit C1 is not equal to the fourth side length L4 corresponding to the second pixel circuit C2, the size of the first pixel circuit C1 is not equal to the size of the second pixel circuit C2. Similarly, if the first side length L1 and the second side length L2 of an area where one of two first pixel circuits C1 is located are equal to the first side length L1 and the second side length L2 of an area where the other of two first pixel circuits C1 is located, respectively, the sizes of the two first pixel circuits C1 are equal. Otherwise, the sizes of the two first pixel circuits C1 are not equal. If the third side length L3 and the fourth side length L4 of an area where one of two second pixel circuits C2 is located are equal to the third side length L3 and the fourth side length L4 of an area where the other of two second pixel circuits C2 is located, respectively, the sizes of the two second pixel circuits C2 are equal. Otherwise, the sizes of the two second pixel circuits C2 are not equal.

Illustratively, the size of the first pixel circuit C1 is equal to the size of the second pixel circuit C2 in the third circuit group 53. The size of each second pixel circuit C2 in the third circuit group 53 is equal and is equal to the size of the first pixel circuit C1. In such arrangement, the first pixel circuit C1 is located in a different area from the corresponding first light-emitting element P1, and the second pixel circuit C2 in the third circuit group 53 is located in a different area from the corresponding second light-emitting element P2, and the size of the first pixel circuit C1 is set to be equal to the size of the second pixel circuit C2 in the third circuit group 53, so the positions and sizes of this part of first pixel circuit C1 and the second pixel circuits C2 can be adjusted in the same manner, facilitating reducing the layout difficulty of the pixel circuit.

Illustratively, that the size of the first pixel circuit C1 is equal to the size of at least one of the second pixel circuits C2 in the second circuit group 52 means that, for all second pixel circuits C2 in the second circuit group 52, the size of the first pixel circuit C1 is equal to the size of at least one of the second pixel circuits C2. Similarly, that the size of the second pixel circuit C2 in the third circuit group 53 is equal to the size of at least one of the second pixel circuits C2 in the fourth circuit group 54 means that, for all second pixel circuits C2 in the fourth circuit group 54, the size of the second pixel circuit C2 in the third circuit group 53 is equal to the size of at least one of the second pixel circuits C2.

For different display panels, compressible amounts of the second pixel circuits C2 corresponding to the second light-emitting elements P2 in the first area 3 and the second display sub-area 2 are different. In the case where the requirements of the line width and the line spacing are met, it is only needed to compress the sizes of part of the second pixel circuits C2 to achieve that the first pixel circuits C1 corresponding to the first light-emitting elements P1 in the first display area S1 are disposed in the first area 3, and the second pixel circuits C2 corresponding to the second light-emitting elements P2 in the second area 4 are disposed in the second display sub-area 2.

Exemplarily, in FIG. 13, the size of each second pixel circuit C2 in the second circuit group 52-1 is equal and is equal to the size of the first pixel circuit C1 group. The size of each second pixel circuit C2 in the second circuit group 52-2 is equal but is not equal to the size of the first pixel circuit C1 (the fourth side length L4 of the second pixel circuit C2 in the second circuit group 52-2 is larger than the second side length L2 of the first pixel circuit C1). The size of each second pixel circuit C2 in the fourth circuit group 54-1 is equal and is equal to the size of the second pixel circuit C2 in the third circuit group 53. The size of each second pixel circuit C2 in the fourth circuit group 54-2 is equal but is not equal to the size of the second pixel circuit C2 in the third circuit group 53 (the fourth side length L4 of the second pixel circuit C2 in the fourth circuit group 54-2 is larger than the fourth side length L4 of the second pixel circuit C2 in the third circuit group 53).

Of course, the implementation shown in FIG. 13 is one of feasible implementations. In other embodiments, referring to FIG. 15, illustratively, the second circuit group 52 includes a first circuit sub-group 521 and a second circuit sub-group 522. The size of the second pixel circuit C2 in the first circuit sub-group 521 is not equal to the size of the second pixel circuit C2 in the second circuit sub-group 522. The first circuit sub-group 521 is located on one side of the second circuit sub-group 522 adjacent to the first circuit group 51. The size of the second pixel circuit C2 in the first circuit grouping 521 is equal to the size of the first pixel circuit C1. The fourth circuit group 54 includes a third circuit sub-group 541 and a fourth circuit sub-group 542. The size of the second pixel circuit C2 in the third circuit sub-group 541 is not equal to the size of the second pixel circuit C2 in the fourth circuit sub-group 542. The third circuit sub-group 541 is located on one side of the fourth circuit sub-group 542 adjacent to the third circuit group 53. The size of the second pixel circuit C2 in the third circuit sub-group 541 is equal to the size of the second pixel circuit C2 in the third circuit group 53.

Illustratively, in this embodiment, the second circuit group 52 is located on one side of the first circuit group 51 facing away from the first display area S1. The second circuit group 52 is divided into the first circuit sub-group 521 and the second circuit sub-group 522. The size of each second pixel circuit C2 in the first circuit sub-group 521 is equal. The size of each second pixel circuit C2 in the second circuit sub-group 522 is equal. The size of the second pixel circuit C2 in the first circuit sub-group 521 is not equal to the size of the second pixel circuit C2 in the second circuit sub-group 522 (the fourth side lengths L4 are not equal). The first circuit sub-group 521 is located on one side of the second circuit sub-group 522 close to the first circuit group 51. The size of the second pixel circuit C2 in the first circuit sub-group 521 is equal to the size of the first pixel circuit C1. In this case, it is only needed to compress the sizes of the original part of second pixel circuits C2 in the first area 3 to form the first circuit sub-group 521 so that the size-compressed first pixel circuits C1 can be disposed in the first area 3. Moreover, such arrangement can make the first circuit group 51 more closer to the first display area S1, thereby facilitating electrically connecting the first pixel circuit C1 to the corresponding first light-emitting element P1, reducing the wiring difficulty, and reducing the influence on the product yield.

In addition, in this embodiment, the third circuit group 53 is located on one side of the fourth circuit group 54 close to the second area 4. The fourth circuit group 54 includes the third circuit sub-group 541 and the fourth circuit sub-group 542. The size of each second pixel circuit C2 in the third circuit sub-group 541 is equal. The size of each second pixel circuit C2 in the fourth circuit sub-group 542 is equal. The size of the second pixel circuit C2 in the third circuit sub-group 541 is not equal to the size of the second pixel circuit C2 in the fourth circuit sub-group 542 (the fourth side lengths L4 are not equal). The third circuit sub-group 541 is located on one side of the fourth circuit sub-group 542 close to the third circuit group 53. The size of the second pixel circuit C2 in the third circuit sub-group 541 is equal to the size of the second pixel circuit C2 in the third circuit group 53. In this case, it is only needed to compress the sizes of the original part of second pixel circuits C2 in the second display sub-area 2 to form the third circuit sub-group 541 so that the size-compressed second pixel circuit C2 corresponding to the second light-emitting element P2 in the second area 4 can be disposed in the second display sub-area 2. Moreover, such arrangement can make the third circuit group 53 more closer to the second area 4, thereby facilitating electrically connecting the second pixel circuit C2 in the third circuit group 53 to the corresponding second light-emitting element P2 in the second area 4, reducing the wiring difficulty, and reducing the influence on the product yield.

In other embodiments, in the case where the requirements of the line width and the line spacing are met, it is also possible to compress the sizes of all first pixel circuits C1 and all second pixel circuits C2 so that each first pixel circuit C1 and each second pixel circuit C2 are equal in size. In this way, the first pixel circuit C1 and the second pixel circuit C2 can have the same driving capability, facilitating the display uniformity.

Figure 16:
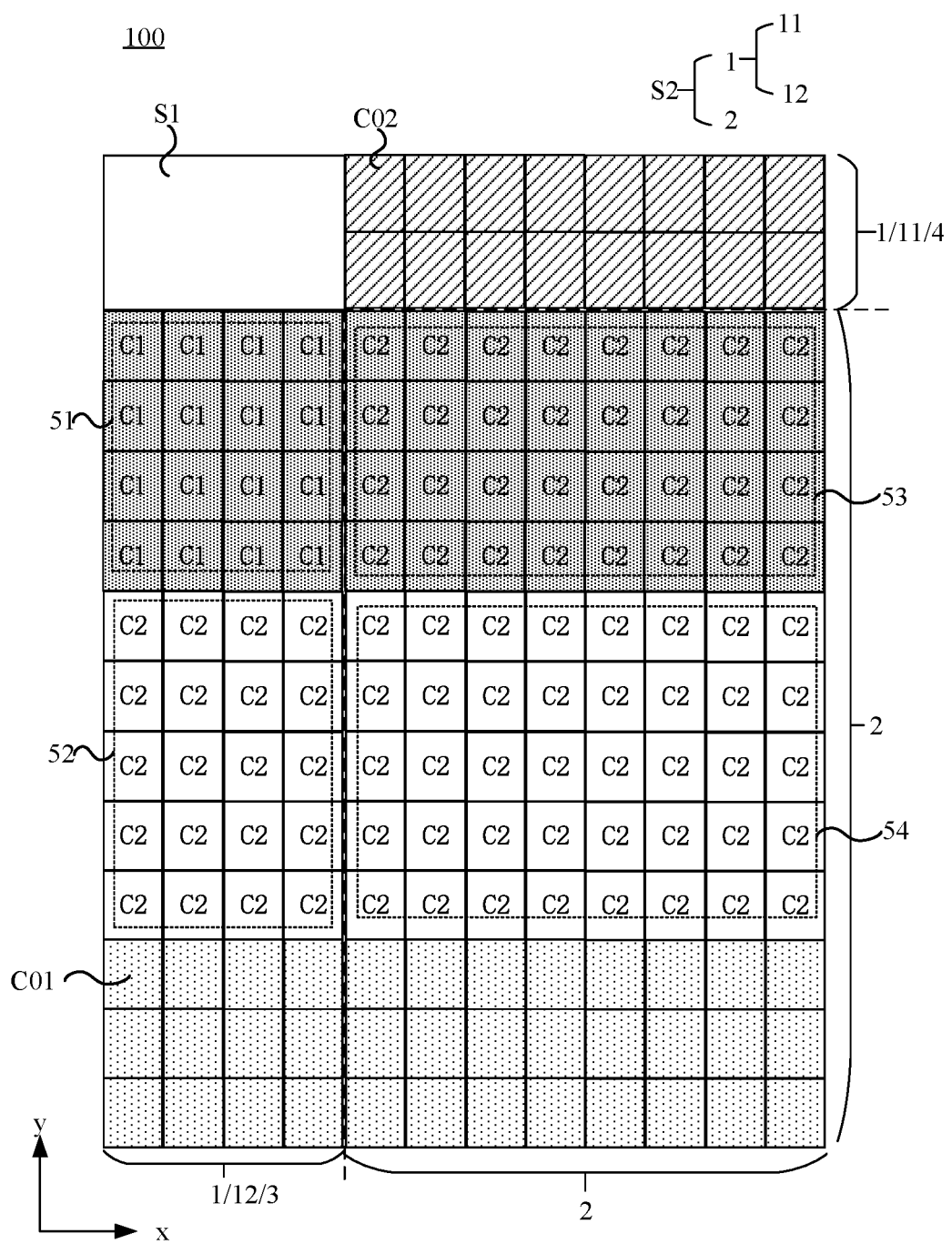
FIG. 16 is an enlarged structural diagram of another display panel corresponding to an area Q4 in FIG. 12.

FIG. 16 is an enlarged structural diagram of another display panel corresponding to an area Q4 in FIG. 12. As shown in FIG. 16, illustratively, the size of each first pixel circuit C1 is equal to the size of each second pixel circuit C2. The display panel 100 further includes multiple first virtual pixel circuits C01 located in the first area 3 and the second display sub-area 2. An orthographic projection of the multiple first virtual pixel circuits C01 on a plane where the display panel is located does not overlap an orthographic projection of the first pixel circuits C1 on the plane where the display panel is located and does not overlap an orthographic projection of the second pixel circuits C2 on the plane where the display panel is located.

Illustratively, when the size of each first pixel circuit C1 is equal to the size of each second pixel circuit C2, if the sizes of the first pixel circuits C1 and the second pixel circuits C2 are compressed to a large extent, it is possible that the first area 3 and the second display sub-area 2 still have space after accommodating the first pixel circuits C1 and the second pixel circuits C2. A metal structure in the pixel circuit reflects ambient light. In the embodiment of the present application, the first virtual pixel circuits C01 are disposed in the first area 3 and the second display sub-area 2 so that the orthographic projection of the first virtual pixel circuits C01 on the plane where the display panel is located does not overlap the orthographic projection of the first pixel circuits C1 on the plane where the display panel is located and does not overlap the orthographic projection of the second pixel circuits C2 on the plane where the display panel is located. The first virtual pixel circuits C01 may be used for equalizing the distribution of the pixel circuits in the display panel, thereby balancing the reflectivity difference among different areas of the display panel, avoiding the visually split-screen phenomenon of human eyes caused by a local absence of the pixel circuits.

Similarly, referring to FIG. 15 or 16, illustratively, second virtual pixel circuits C02 are disposed in the second area 4. It should be noted that the first virtual pixel circuit C01/the second virtual pixel circuit C02 has the same structure as the first pixel circuit C1/the second pixel circuit C2 except that neither the first virtual pixel circuit C01 nor the second virtual pixel circuit C02 can drive either the first light-emitting element P1 or the second light-emitting element P2 to emit light. Those skilled in the art may achieve the purpose that the virtual pixel circuit cannot drive the light-emitting element to emit light in any manner. For example, the virtual pixel circuit is not electrically connected to the scanning line, the data line, and the PVDD line, or the virtual pixel circuit is not electrically connected to the light-emitting element, or the virtual pixel circuit is electrically connected to the light-emitting element but the light-emitting element itself cannot be driven to emit light (e.g. the absence of at least one of the cathode, the anode, an opening of the pixel defining layer, and the light-emitting layer). This embodiment of the present application is not limited thereto. In addition, the size of the first virtual pixel circuit C01/the second virtual pixel circuit C02 may be the same as or different from the size of the first pixel circuit C1/the second pixel circuit C2. This embodiment of the present application is not limited thereto.

Next, the layout of the first virtual pixel circuits C01 in the first area 3 and the second display sub-area 2 will be described by way of examples.

Referring to FIG. 16, illustratively, the first virtual pixel circuits C01 are located on one side of the second circuit group 52 facing away from the first circuit group 51 and on one side of the fourth circuit group 54 facing away from the third circuit group 53. Such arrangement can reduce the influence on the layout of the first pixel circuit C1 and the second pixel circuit C2 and reduce the layout difficulty of the pixel circuit.

Of course, the arrangement manner of the first virtual pixel circuits C01 shown in FIG. 16 is only one of feasible embodiments. In other embodiments, as shown in FIG. 17, FIG. 17 is an enlarged structural diagram of another display panel corresponding to an area Q4 in FIG. 12.

Illustratively, at least one first virtual pixel circuit C01 is located in one of the following locations: between two adjacent first pixel circuits C1, between two adjacent second pixel circuits C2, or between two adjacent first pixel circuit C1 and second pixel circuit C2.

Illustratively, the first virtual pixel circuits C01 may be inserted into the layout of the first pixel circuits C1 and the second pixel circuits C2. Exemplarily, one first virtual pixel circuit C01 may be located between two adjacent first pixel circuits C1, or between two adjacent second pixel circuits C2, or between two adjacent first pixel circuit C1 and second pixel circuit C2. This embodiment of the present application is not limited thereto.

Figure 17:
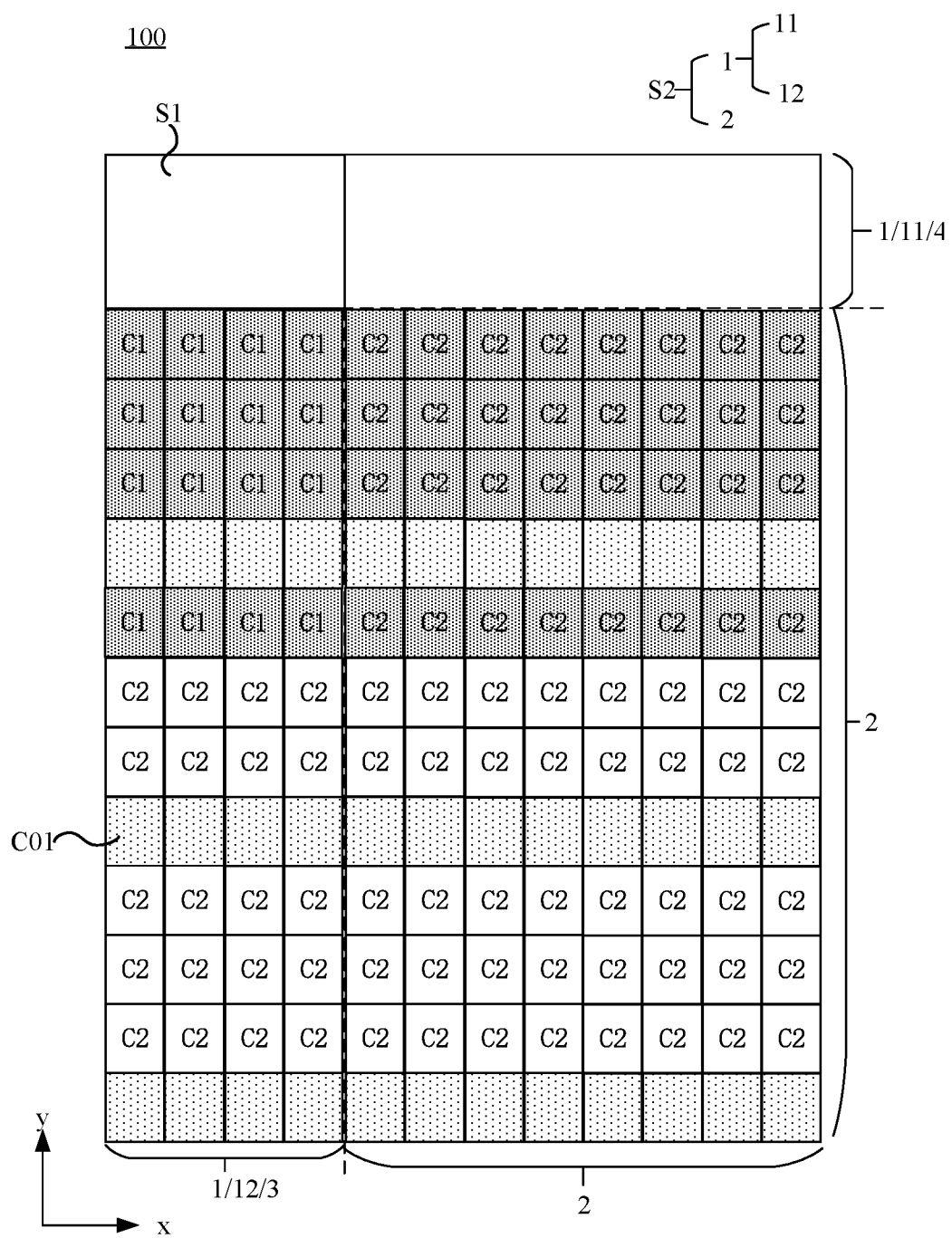
FIG. 17 is an enlarged structural diagram of another display panel corresponding to an area Q4 in FIG. 12.

Referring to FIG. 17, illustratively, m actual pixel circuits are included between any two adjacent first virtual pixel circuits C01 in the first direction x. m is a natural number. When m>0, the m actual pixel circuits include at least one of a first pixel circuit C1 and a second pixel circuit C2. N actual pixel circuits are included between any two adjacent first virtual pixel circuits C01 in the second direction y. n is a natural number. When n>0, the n actual pixel circuits include at least one of a first pixel circuit C1 and a second pixel circuit C2. M and n are not both 0.

The actual pixel circuit refers to a pixel circuit, such as the first pixel circuit C1 and the second pixel circuit C2, electrically connected to the first light-emitting element P1 or the second light-emitting element P2. In the first direction x or the second direction y, when the actual pixel circuit exists between two adjacent first virtual pixel circuits C01, the actual pixel circuit may be at least one of the first pixel circuit C1 and the second pixel circuit C2.

Exemplarily, FIG. 17 illustrates using an example where m=0, n=3. In this case, no actual pixel circuit exists between any two adjacent first virtual pixel circuits C01 in the first direction x. Three actual pixel circuits are included between any two adjacent first virtual pixel circuits C01 in the second direction y. Multiple first virtual pixel circuits are arranged in the same row and inserted among several rows of actual pixel circuits.

Figure 18:
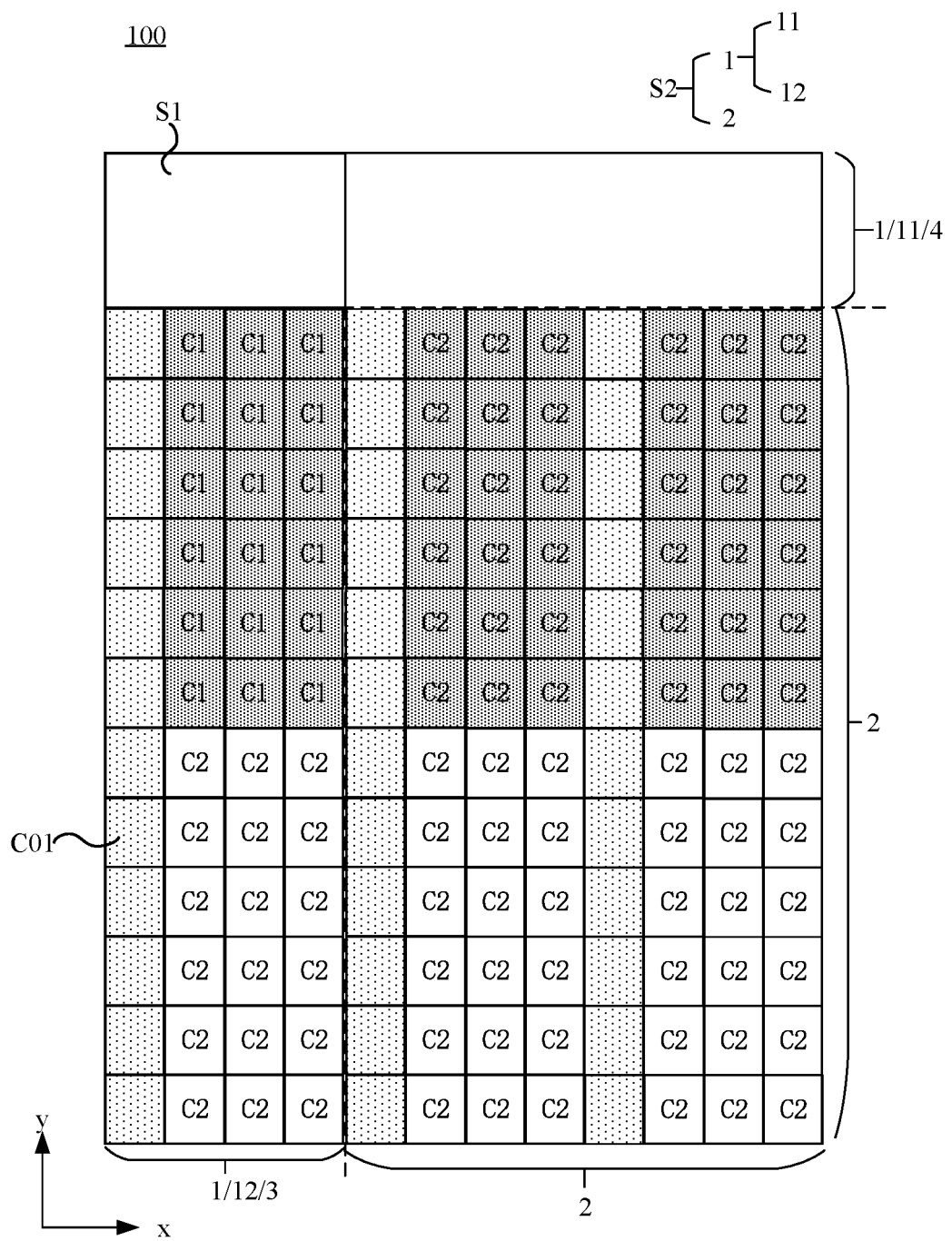
FIG. 18 is an enlarged structural diagram of another display panel corresponding to an area Q4 in FIG. 12.

FIG. 18 is an enlarged structural diagram of another display panel corresponding to an area Q4 in FIG. 12. As shown in FIG. 18, in other embodiments, m≠0 (illustrated by m=3 in FIG. 18) and n=0. In this case, three actual pixel circuits are included between any two adjacent first virtual pixel circuits C01 in the first direction x. No actual pixel circuits exist between any two adjacent first virtual pixel circuits C01 in the second direction y. The multiple first virtual pixel circuits C01 are arranged in the same column and inserted among several columns of actual pixel circuits.

Figure 19:
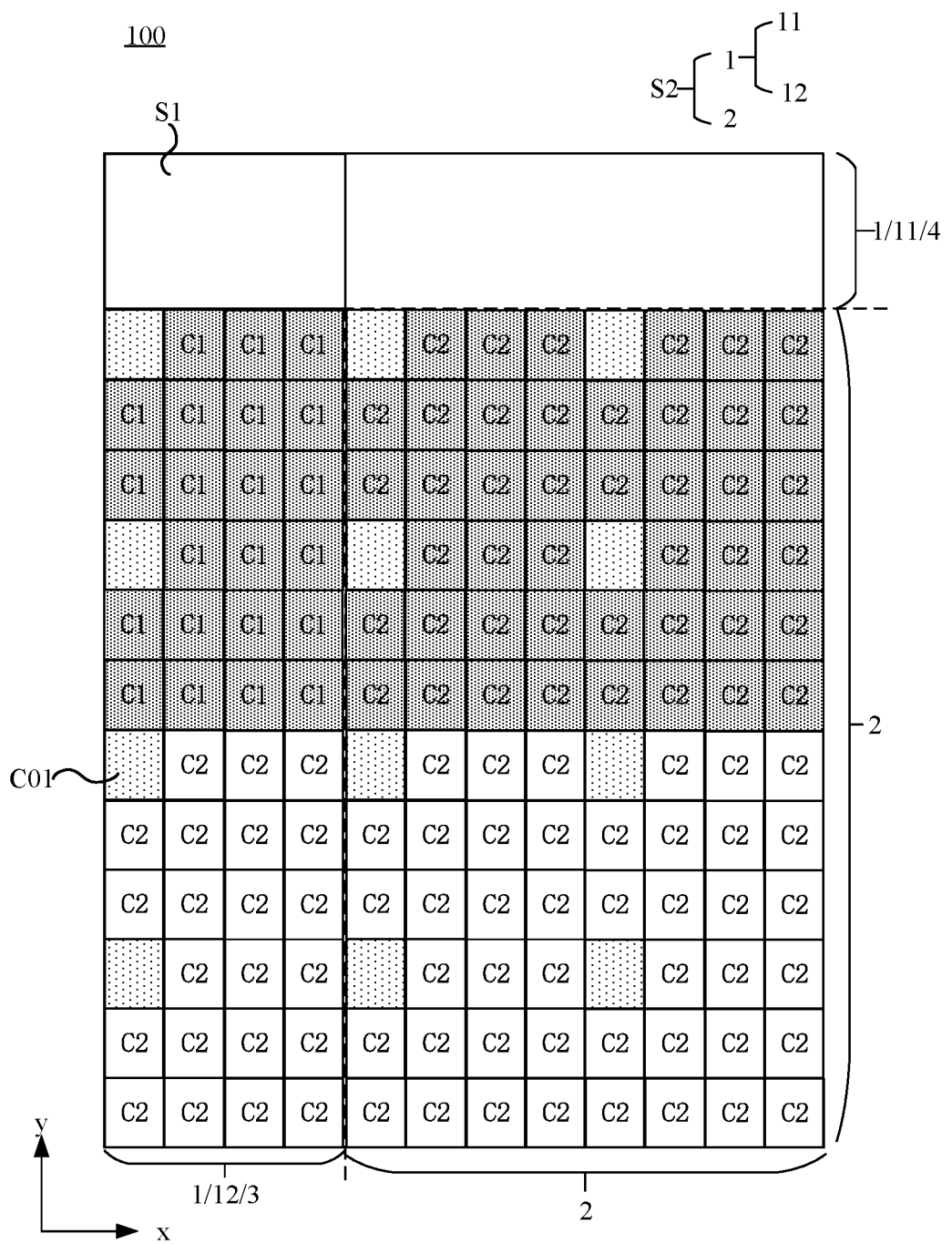
FIG. 19 is an enlarged structural diagram of another display panel corresponding to an area Q4 in FIG. 12.

Of course, in other embodiments, both m and n may not be equal to 0. Exemplarily, FIG. 19 is an enlarged structural diagram of another display panel corresponding to an area Q4 in FIG. 12. FIG. 19 illustrates using an example where m=3, and n=2. In this case, three actual pixel circuits are included between any two adjacent first virtual pixel circuits C01 in the first direction x. Two actual pixel circuits are included between any two adjacent first virtual pixel circuits C01 in the second direction y. Each first image virtual pixel circuit is independently inserted between two adjacent actual pixel circuits. It is to be understood that when m=n, the first virtual pixel circuit C01 is evenly inserted between two adjacent actual pixel circuits.

Figure 20:
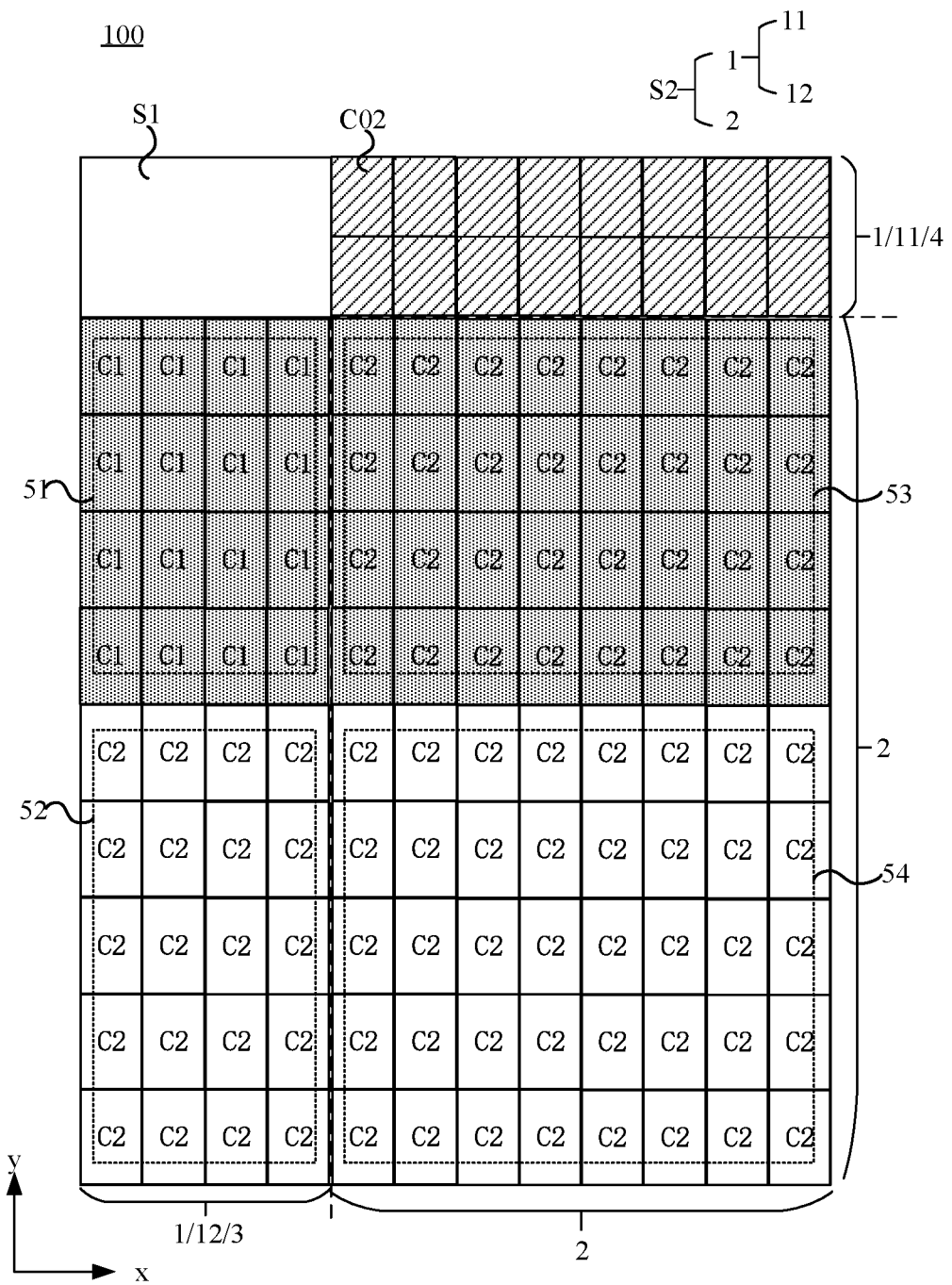
FIG. 20 is an enlarged structural diagram of another display panel corresponding to an area Q4 in FIG. 12.

FIG. 20 is an enlarged structural diagram of another display panel corresponding to an area Q4 in FIG. 12. As shown in FIG. 20, illustratively, a size of each first pixel circuit C1 of the multiple first pixel circuits C1 and a size of each second pixel circuit C2 of the multiple second pixel circuits C2 are equal and the multiple first pixel circuits C1 and the multiple second pixel circuits C2 are distributed in an area other than the second area 4 in the second display area S2. Illustratively, in this embodiment, no first virtual pixel circuit C01 is disposed in the first area 3 and the second display sub-area 2 so that the compression degree of the first pixel circuit C1 and the second pixel circuit C2 can be relatively small. That is, compared with the solution where the first virtual pixel circuit C01 is disposed in the first area 3 and the second display sub-area 2, the sizes of the first pixel circuit C1 and the second pixel circuit C2 can be relatively large, thereby ensuring that the line width and the line spacing have a certain design margin, thus reducing the risk of short-circuit and ensuring the product yield.

It should be noted that FIG. 20 illustrates by an example where one first area 3 includes one first circuit group 51 and one second circuit group 52, the one first circuit group 51 is located on one side of the one second circuit group 52 close to the first display area S1, one second display sub-area 2 includes one third circuit group 53 and one fourth circuit group 54, the one third circuit group 53 is located on one side of the one fourth circuit group 54 close to the second area 4, and each first pixel circuit C1 in the first circuit group 51 and each second pixel circuit C2 in the second circuit group 52, the third circuit group 53, and the fourth circuit group 54 are equal in size. This arrangement manner is not limiting. In other embodiments, one first area 3 may include multiple alternatively-arranged first circuit groups 51 and second circuit groups 52, one second display sub-area 2 may include multiple alternatively-arranged third circuit groups 53 and fourth circuit groups 54. The arrangement manner of the first pixel circuits C1 and the second pixel circuits C2 is not limited in the embodiments of the present application as long as each first pixel circuit C1 and each second pixel circuit C2 are ensured to be equal in size.

It should also be noted that, for ease of illustration, FIGS. 13 to 20 illustrate using an example where the first area 3 is the second sub-region 12, the second area 4 is the first sub-region 11, and the first display sub-area 1 includes one first sub-region 11 and one second sub-region 12. The first pixel circuits C1 and the second pixel circuits C2 may be symmetrically laid out in other second areas 12 and second display sub-areas 2 in FIG. 12 with reference to any one of the arrangement manners in FIGS. 13 to 20, and details are not repeated herein.

Referring to FIG. 12, it should also be noted that when the first display area S1 is a camera area, the first pixel circuits C1 are located in the second sub-region 12, and the second pixel circuits C2 corresponding to the second light-emitting elements P2 in the first sub-region 11 are located in the second display sub-area 2, the second sub-region 12 above the first display area S1 and two second display sub-areas 2 above the first sub-region 11 in FIG. 12 generally have relatively small areas, so it is possible to determine whether to use the second sub-region 12 to dispose part of the first pixel circuits C1 according to actual situations. Similarly, it is also possible to determine whether to use two second display sub-areas 2 above the first sub-region 11 to dispose part of the second pixel circuits C2 corresponding to the second light-emitting elements P2 in the first sub-region 11. This embodiment of the present application is not limited thereto.

In summary, the preceding embodiment illustrates the arrangement manner of the first pixel circuits C1 and the second pixel circuits C2 in detail using an example where the first area 3 is the second sub-region 12, the second area 4 is the first sub-region 11, the first pixel circuits C1 are located in the second sub-region 12, and the second pixel circuits C2 corresponding to the second light-emitting elements P2 in the first sub-region 11 is located in the second display sub-area 2. Any of the preceding implementations can be applied to an embodiment where the first area 3 is the first sub-region 11 and the second area 4 is the second sub-region 12. Next, the arrangement manner of the first pixel circuits C1 and the second pixel circuits C2 is briefly illustrated by using the example where the first area 3 is the first sub-region 11 and the second area 4 is the second sub-region 12.

Figure 21:
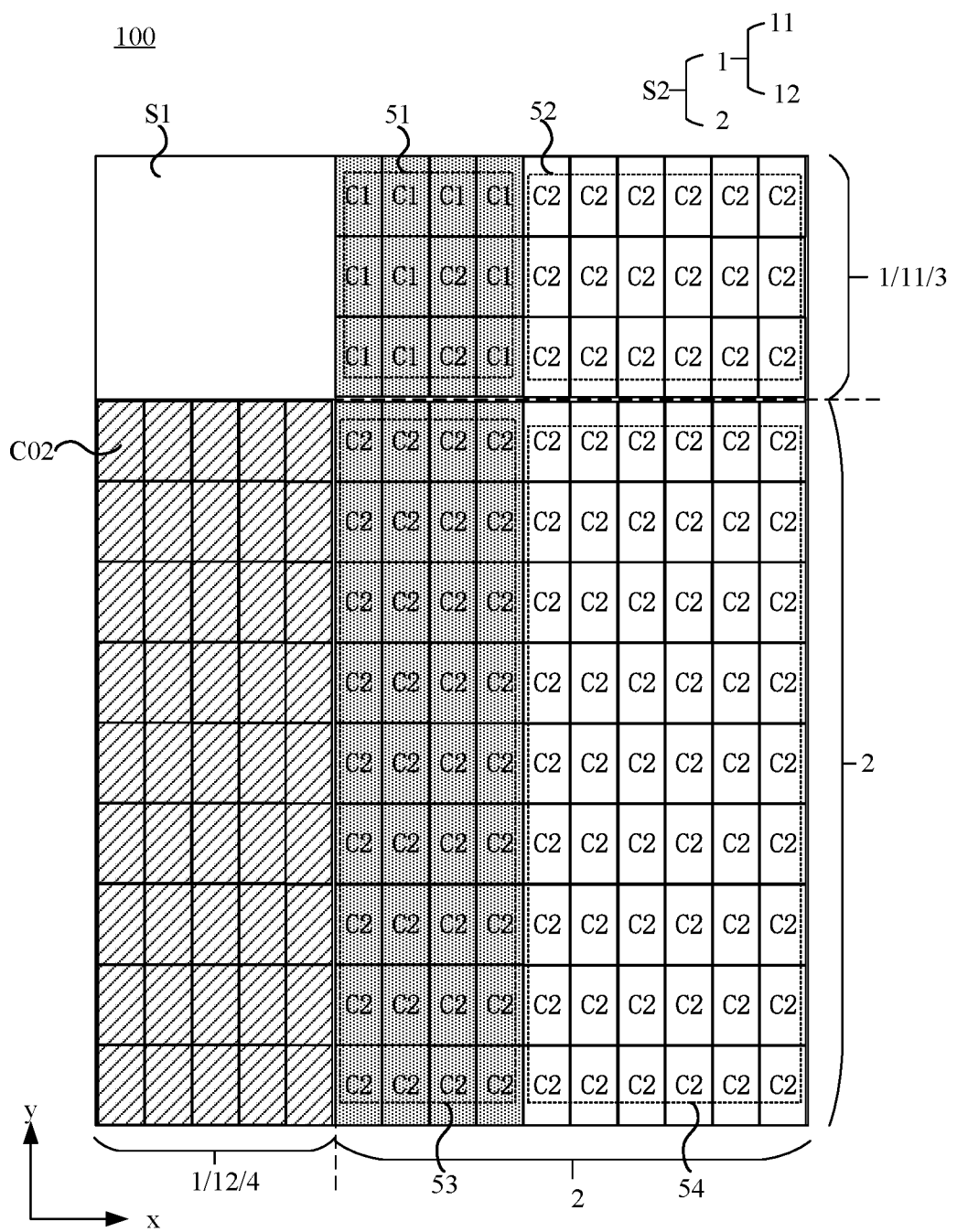
FIG. 21 is an enlarged structural diagram of another display panel corresponding to an area Q4 in FIG. 12.

Exemplarily, FIG. 21 is an enlarged structural diagram of another display panel corresponding to an area Q4 in FIG. 12. As shown in FIG. 21, the first area 3 is the first sub-region 11, the second area 4 is the second sub-region 12, the first pixel circuits C1 are located in the first sub-region 11, and the second pixel circuits C2 corresponding to the second light-emitting elements P2 in the second sub-region 12 is located in the second display sub-area 2. FIG. 21 fills rectangles denoting areas in which the first pixel circuits C1 and the second pixel circuits C2 corresponding to the second light-emitting elements P2 in the second sub-region 12 are located for ease of distinction. In the implementation shown in FIG. 21, one of first sub-regions 11 of the display panel includes one first circuit group 51 and one second circuit group 52. The one first circuit group 51 is located on one side of the one second circuit group 52 close to the first display area S1. One of second display sub-areas 2 of the display panel includes one third circuit group 53 and one fourth circuit group 54. The one third circuit group 53 is located on one side of the one fourth circuit group 54 close to the second sub-region 12. Each first pixel circuit C1 and each second pixel circuit C2 are equal in size, and second virtual pixel circuits C02 are disposed in the first sub-regions 11. For other feasible arrangement manners of the first pixel circuits C1 and the second pixel circuits C2, reference may be made to related embodiments where the first area 3 is the second sub-region 12 and the second area 4 is the first sub-region 11. Details are not repeated herein.

Figure 22:
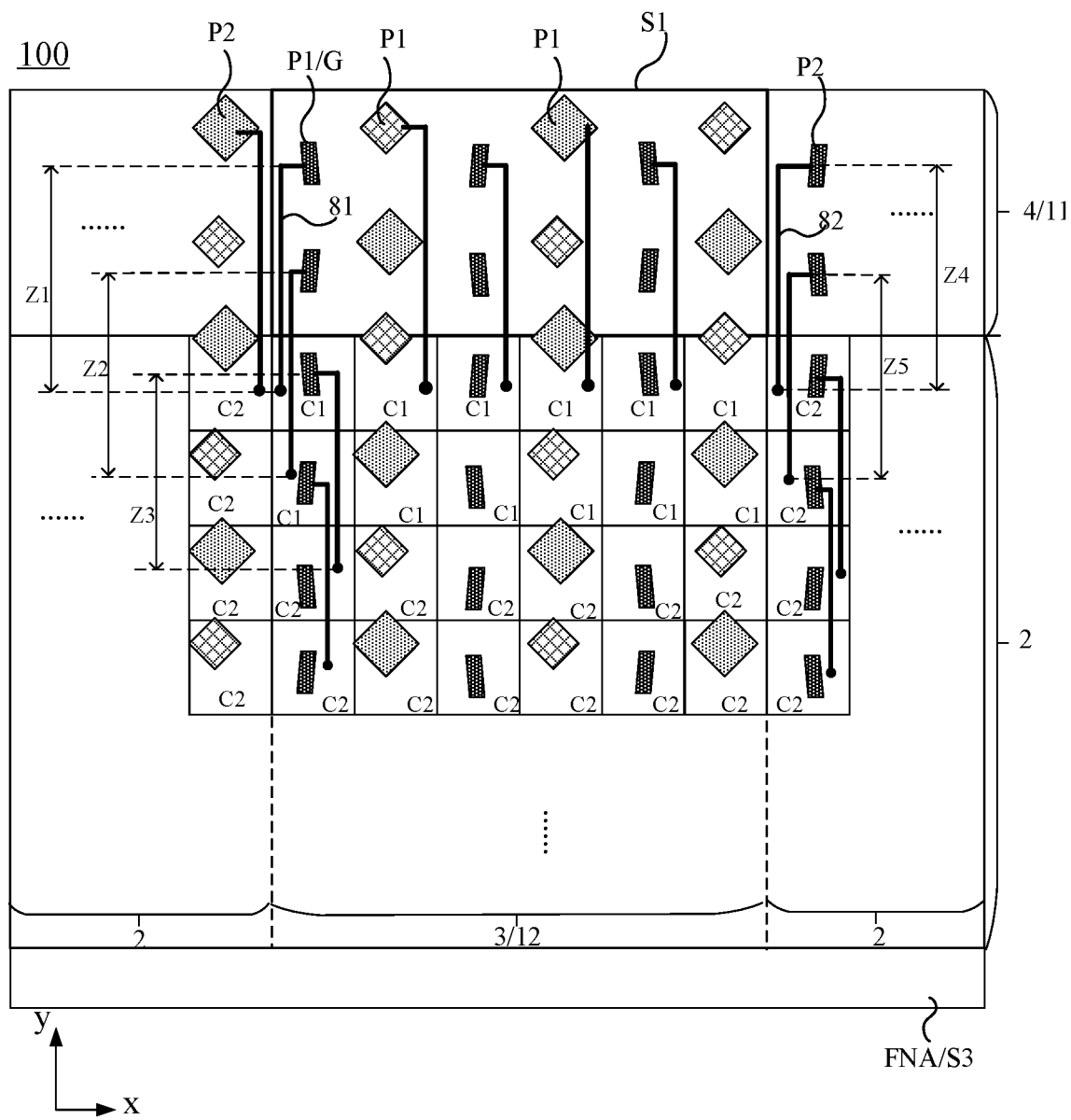
FIG. 22 is a structural diagram of another display panel according to an embodiment of the present application.

On the basis of the preceding embodiments, FIG. 22 is a structural diagram of another display panel according to an embodiment of the present application. As shown in FIG. 22, illustratively, in a direction from the first display area S1 to the second area 4, the first light-emitting elements P1 in the same line are in a one-to-one correspondence electrically connected to the first pixel circuits C1 in the same line, and the second light-emitting elements P2 in the same line are in a one-to-one correspondence electrically connected to the second pixel circuits C2 in the same line.

As mentioned above, the second area 4 may be one of the first sub-region 11 and the second sub-region 12. Referring to FIG. 6, for example, the first direction x is the row direction, and the second direction y is the column direction. If the second area 4 is the first sub-region 11, the direction from the first display area S1 to the second area 4 is the row direction. The first light-emitting elements P1 in the same line are the first light-emitting elements P1 in the same row. The first pixel circuits C1 in the same line are the first pixel circuit C1 in the same row. The second light-emitting elements P2 in the same line are the second light-emitting elements in the same row. The second pixel circuits C2 in the same line are the second pixel circuits C2 in the same row.

Similarly, referring to FIG. 6, if the second area 4 is the second sub-region 12, the direction from the first display area S1 to the second area 4 is the column direction. The first light-emitting elements P1 in the same line are the first light-emitting elements P1 in the same column. The first pixel circuits C1 in the same line are the first pixel circuits C1 in the same column. The second light-emitting elements P2 in the same line are the second light-emitting elements P2 in the same column. The second pixel circuits C2 in the same line are the second pixel circuits C2 in the same column.

Exemplarily, FIG. 22 illustrates using an example where the second area 4 is the first sub-region 11. As shown in FIG. 22, the first light-emitting element P1 in the same row are in a one-to-one correspondence electrically connected to the first pixel circuits C1 in the same row. The second light-emitting elements P2 in the same row are in a one-to-one correspondence electrically connected to the second pixel circuits C2 in the same row. In other embodiments, the second area 4 is the second sub-region 12. In this case, the first light-emitting elements P1 in the same column are in a one-to-one correspondence electrically connected to the first pixel circuits C1 in the same column. The second light-emitting elements P2 in the same column are in a one-to-one correspondence electrically connected to the second pixel circuits C2 in the same column.

In the direction from the first display area S1 to the second area 4, in the embodiment of the present application, the first light-emitting elements P1 in the same line are in a one-to-one correspondence electrically connected to the first pixel circuits C1 in the same line and the second light-emitting elements P2 in the same line are in a one-to-one correspondence electrically connected to the second pixel circuits C2 in the same line, which makes: the first pixel circuits C1 corresponding to the first light-emitting elements P1 in the same line in the first display area S1 being located in the same line, and makes the second pixel circuits C2 corresponding to the second light-emitting elements P2 in the same line in the second area 4 being located in the same line, thereby reducing the scattering degree of the pixel circuits, facilitating wiring the signal lines such as the scan line or the data line, reducing the winding and the influence on the product yield.

It should be noted that the first pixel circuits C1 in two lines corresponding to the first light-emitting elements P1 in two adjacent lines (rows/columns) may or may not be disposed adjacently. Similarly, the second pixel circuits C2 in two lines corresponding to the second light-emitting elements P2 in two adjacent lines may or may not be disposed adjacently. This embodiment of the present application is not limited thereto.

Referring to FIG. 22, illustratively, the first light-emitting elements P1 are electrically connected to the corresponding first pixel circuits C1 through first connection lines 81. At least part of the second light-emitting elements P2 are electrically connected to the corresponding second pixel circuits C2 through second connection lines 82. In a direction from the first area 3 to the first display area S1, the closer the first pixel circuit C1 to the first display area S1, the longer the length of a first connection line 81 corresponding to the first pixel circuit C1, and the closer the second pixel circuit C2 to the first display area S1 or the second area 4, the longer the length of a second connection line 82 corresponding to the second pixel circuit C2. As shown in FIG. 22, a connection line electrically connected to the first pixel circuit C1 is the first connection line 81. The closer the first pixel circuit C1 to the first display area S1, the longer the length of the first connection line 81 corresponding to the first pixel circuit C1, (e.g. Z1>Z2). A connection line electrically connected to the second pixel circuit C2 is the second connection line 82. The closer the second pixel circuit C2 to the first display area S1 or the second area 4, the longer the length of the second connection line 82 corresponding to the second pixel circuit C2 (e.g. Z4>Z5). For ease of observation, FIG. 22 merely illustrates part of the first connection lines 81 between the first light-emitting elements P1 and the first pixel circuits C1, and part of the second connection lines 82 between the second light-emitting elements P2 and the second pixel circuits C2.

Illustratively, when the first area 3 is the second sub-region 12, the direction from the first area 3 to the first display area S1 is parallel to the second direction y (the same as or opposite to the direction y shown in the figure). When the first area 3 is the first sub-region 11, the direction from the first area 3 to the first display area S1 is parallel to the first direction x (the same as or opposite to the direction x shown in the figure). Exemplarily, referring to FIG. 12, an example where the first area 3 is the second sub-region 12 is used. The direction from the second sub-region 12 below the first display area S1 to the first display area S1 is the same as the direction y, and the direction from the second sub-region 12 above the first display area S1 to the first display area S1 is opposite to the direction y.

No matter in which first area 3 the first pixel circuit C1 is located, the closer the first pixel circuit C1 to the first display area S1, the longer the length of the first connection line 81 corresponding to the first pixel circuit C1 so that the relative positional relationship of multiple first pixel circuits C1 located in the same first area 3 and arranged in the direction from the first area 3 to the first display area S1 is the same as the relative positional relationship of multiple first light-emitting elements P1 corresponding to the first pixel circuits C1 (the multiple first light-emitting elements P1 are also arranged in the direction from the first area 3 where the first pixel circuits C1 are located to the first display area S1), thereby facilitating improving the wiring regularity of the first connection lines 81, and reducing the wiring complexity and the influence on the product yield. Similarly, the closer the second pixel circuit C2 to the first display area S1 or the second area 4, the longer the length of the second connection line 82 corresponding to the second pixel circuit C2 so that the relative positional relationship of multiple second pixel circuits C2 located in the same first area 3 and arranged in the direction from the first area 3 to the first display area S1 is the same as the relative positional relationship of multiple second light-emitting elements P2 corresponding to the second pixel circuits C2, and moreover, the relative positional relationship of multiple second pixel circuits C2 located in the same second display sub-area 2 and arranged in the direction from the second display sub-area 2 to the second area 4 is the same as the relative positional relationship of multiple second light-emitting elements P2 corresponding to the second pixel circuits C2, thereby facilitating improving the wiring regularity of the second connection lines 82, and reducing the wiring complexity and the influence on the product yield.

It should be noted that FIG. 22 merely illustrates using an example where multiple first pixel circuits C1 arranged in the direction from the first area 3 to the first display area S1 are disposed adjacently and close to the first display area S1, and multiple second pixel circuits C2 corresponding to the second light-emitting elements P2 in the second area 4 arranged in the direction from the second display sub-area 2 to the second area 4 are disposed adjacently and close to the second area 4. In other embodiments, in multiple first pixel circuits C1 arranged in the direction from the first area 3 to the first display area S1, several second pixel circuits C2 may be included between two adjacent first pixel circuits C1, and several second pixel circuits C2 in the fourth circuit group 54 may be included between two adjacent second pixel circuits C2 corresponding to the second light-emitting elements P2 in the second area 4 (see FIG. 13). This embodiment of the present application is not limited thereto.

As shown in FIG. 22, in one embodiment, illustratively, the display panel 100 further includes a non-display area FNA. The non-display area FNA includes a binding area S3. The first display sub-area 1 includes at least one first area 3, One of first areas 3 is located between the first display area S1 and the binding area S3. The first pixel circuits C1 are all located in the one first area 3. The second pixel circuits C2 corresponding to the second light-emitting elements P2 in the second area 4 are all located in the second display sub-area 2 adjacent to the one first area 3. In the direction from the first display area S1 to the second area 4, the first light-emitting elements P1 in the same line are sequentially in a one-to-one correspondence electrically connected to the first pixel circuits C1 in the same line, and the second light-emitting elements P2 in the same line are sequentially in a one-to-one correspondence electrically connected to the second pixel circuits C2 in the same line. Moreover, in a direction from the first display area S1 to the binding area S3, light-emitting devices in the ith line correspond to and are electrically connected to actual pixel circuits in the ith line, and i is a positive integer. One line of light-emitting devices includes at least one of the first light-emitting element P1 or the second light-emitting element P2, and one row of actual pixel circuits includes at least one of the first pixel circuit C1 or the second pixel circuit C2.

Generally, the binding area S3 is located at the lower frame of the display panel, i.e. located at the bottom end of the display panel in the column direction. Therefore, when the second direction y is the column direction, the first area 3 is the second sub-region 12, and the second area 4 is the first sub-region 11. The number of first areas 3 is consistent with the number of second sub-regions 12, and the number of second areas 4 is consistent with the number of first sub-regions 11. Reference can be made to the preceding description and the position of the binding area S3 can be determined according to the position where the first display area S1 is located.

An example where the first display area S1 is the camera area is used. The first display area S1 is generally adjacent to or close to the upper boundary of the total display area. FIG. 22 illustrates using an example where the first display area S1 is adjacent to the upper boundary of the total display area. One first area 3 is included between the first display area S1 and the binding area S3. The first area 3 has a relatively large area. It can be seen from FIG. 22, in this embodiment, the first pixel circuit C1 are disposed in the first area 3 between the first display area S1 and the binding area S3. The second pixel circuits C2 corresponding to the second light-emitting elements P2 in the second area 4 is disposed in the second display sub-area 2 adjacent to the first area 3. The first light-emitting elements P1 in the same row in the direction from the first display area S1 to the second area 4 are sequentially in a one-to-one correspondence electrically connected to the first pixel circuits C1 in the same row. The second light-emitting elements P2 in the same row in the direction from the first display area S1 to the second area 4 are sequentially in a one-to-one correspondence electrically connected to the second pixel circuits C2 in the same row. Moreover, in the direction from the first display area S1 to the binding area S3, the light-emitting devices in the ith line correspond to and are electrically connected to the actual pixel circuits in the ith line so that the length of the connection lines corresponding to the actual pixel circuits in the ith line is larger than the length of the connection lines corresponding to actual pixel circuits in the i+1 line. That is, the closer the actual pixel circuits to the first display area S1, the longer the connection lines (the first connection lines 81 or the second connection lines 82) corresponding to the actual pixel circuits. As shown in FIG. 22, the lengths of the connection lines corresponding to the first three green light-emitting elements G in the second column are sequentially Z1, Z2, and Z3, and Z1>Z2>Z3 can be made using the preceding arrangement.

In this way, since a driver chip is electrically connected to the binding area S3 and a data signal is transmitted to each actual pixel circuit through the data line. The farther the actual pixel circuit from the binding area S3, the larger the load of the data line. That is, the data line itself has a load gradient situation when transmitting the data signal to the actual pixel circuit. In the related art, the display uniformity can be improved using a certain software algorithm. However, in this embodiment, in the preceding arrangement manner, the farther the actual pixel circuits from the binding area S3, the longer the length of the connection lines corresponding to the actual pixel circuits so that the load gradient situation can be maintained, and the driving software algorithm in the related art does not need to be broken, thereby facilitating ensuring the display uniformity.

Figure 23:
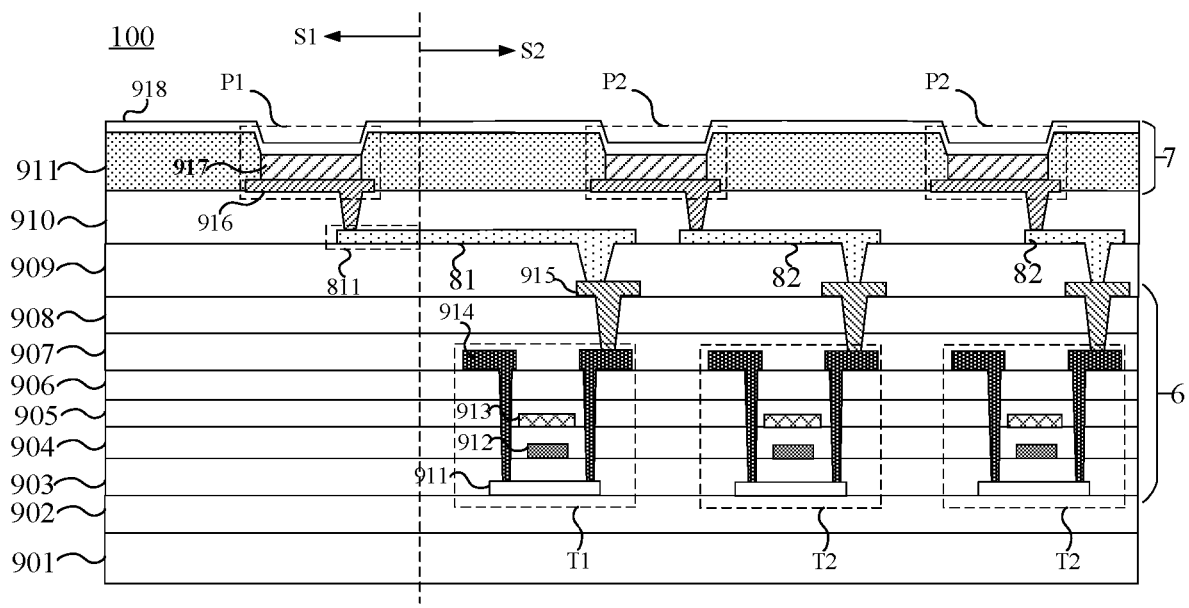
FIG. 23 is a sectional diagram of a display panel according to an embodiment of the present application.

FIG. 23 is a sectional diagram of a display panel according to an embodiment of the present application. As shown in FIG. 23, the display panel 100 includes a substrate 901, a pixel circuit layer 6, and a light-emitting element layer 7. The pixel circuit layer 6 includes multiple first pixel circuits and multiple second pixel circuits. FIG. 23 illustrates one thin film transistor T1 in the first pixel circuit and one thin film transistor T2 in the second pixel circuit. The light-emitting element layer 7 includes multiple first light-emitting elements P1 and multiple second light-emitting elements P2. The first light-emitting elements P1 are located in the first display area S1. The second light-emitting elements P2 are located in the second display area S2. The pixel circuits in the pixel circuit layer 6 are electrically connected to the corresponding light-emitting elements. As shown in FIG. 23, the first light-emitting element P1 is electrically connected to the first pixel circuit C1 through the first connection line 81. The second light-emitting element P2 is electrically connected to the second pixel circuit C2 through the second connection line 82.

Referring to FIG. 23, a buffer layer 902, an active layer 911, a gate insulating layer 903, a first metal layer 912, a first interlayer dielectric layer 904, a capacitor plate layer 913, a second interlayer dielectric layer 905, a third interlayer dielectric layer 906, a second metal layer 914, a fourth interlayer dielectric layer 907, a first planarization layer 908, a third metal layer 915, a second planarization layer 909, a conductive film layer where the first connection lines 81 and the second connection lines 82 are located, a third planarization layer 910, and a pixel defining layer 911 that are arranged in a stacked are included between the substrate 901 and the light-emitting element layer 7. The first light-emitting element P1 and the second light-emitting element P2 each include an anode 916, a light-emitting layer 917, and a cathode 918. Herein, the first metal layer 912 is used for forming at least the gate of the thin film transistor. The capacitor plate layer 913 is used for forming at least the capacitor plate of the storage capacitor. The second metal layer 914 is used for forming at least the source and the drain of the thin film transistor. The third metal layer 915 is used for forming a metal structure for connecting the source (the drain) of the thin film transistor to the connection line (the first connection line 81 or the second connection line 82). The pixel defining layer 911 has a pixel opening from which the anode 916 of the light-emitting element is exposed and in which the material of the light-emitting layer 917 is deposited. Illustratively, the first connection lines 81 and the second connection lines 82 are located between the second planarization layer 909 and the third planarization layer 910.

It should be noted that, FIG. 23 illustrates using an example where the first connection lines 81 and the second connection lines 82 are located on the same layer. In other embodiments, at least one first connection line 81 and/or at least one second connection line 82 may be located on a different film layer from the other first connection lines 81 and the second connection lines 82. This embodiment of the present application is not limited thereto.

Referring to FIG. 23, illustratively, the first connection lines 81 includes first connection sections 811 located in the first display area S1. At least one of the first connection sections 811 is a transparent wiring.

The light transmittance of the transparent wiring is much larger than the light reflectance of the transparent wiring, and the light reflectance of the transparent wiring may even be zero, depending on the material of the selected transparent wiring.

That the first connection section 811 is located in the first display area S1 can be understood that an orthographic projection of the first connection section 811 on the plane where the display panel is located is located in the first display area S1. The first display area S1 needs to make light carrying object information pass through the display panel and hit a photosensitive element of the back side (a non-display side) of the display panel. The light is received and recognized by the photosensitive element. Therefore, the first display area S1 has a high requirement for the light transmittance. In the embodiment of the present application, at least one of first connection sections 811 is the transparent wiring, thereby facilitating reducing the influence on the light transmittance in the first display area S1.

In an embodiment of the present application, it should be noted that all first connection portions 811 of the first connection lines 81 may be set as transparent wirings, or part of the first connection portions 811 of the first connection lines 81 may be set as transparent wirings. This embodiment of the present application is not limited thereto. Exemplarily, if the first connection section 811 of one first connection line 81 is located at the edge of the first display area S1, the first connection section 811 may also use a metal wiring since light transmission amount of the edge of the first display area S1 has a relatively small influence on the imaging quality.

In an embodiment of the present application, it should also be noted that the first connection line 81 may be integrally set as the transparent wiring; or merely the first connection section 811 located in the first display area S1 may be set as the transparent wiring, and the remaining part of the first connection line 81 is set as the metal wiring. This embodiment of the present application is not limited thereto. In addition, the second connection 82 may be the transparent wiring or the metal wiring. This embodiment of the present application is not limited thereto.

Figure 24:
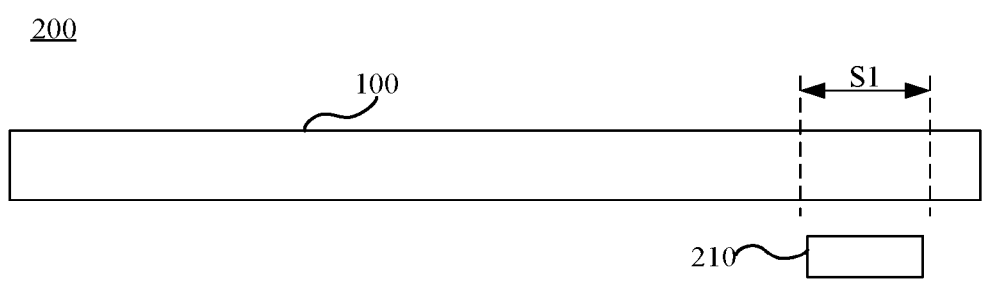
FIG. 24 is a structural diagram of a display device according to an embodiment of the present application.

Based on the same concept, an embodiment of the present application further provides a display device. FIG. 24 is a structural diagram of a display device according to an embodiment of the present application. As shown in FIG. 24, the display device 200 includes a photosensitive element 210 and the display panel 100 provided in any one of the preceding embodiments. The photosensitive element 210 is disposed corresponding to the first display area S1. The display device includes the display panel provided in any one of the preceding embodiments, thereby having the same beneficial effects as the preceding display panel. Similarities may be understood with reference to the description of the preceding display panel embodiments and are not repeated here. The display device 200 provided by the embodiment of the present application may be a phone shown in FIG. 24 or any electronic product having a display function including but not limited to: a television, a notebook computer, a desktop display, a tablet computer, a digital camera, a smart bracelet, smart glasses, an in-vehicle display, medical equipment, industrial control equipment, a touch interactive terminal and is not particularly limited in the embodiment of the present application.

What is claimed is:

1. A display panel, comprising:
a first display area and a second display area, wherein light transmittance in the first display area is larger than light transmittance in the second display area;
the first display area comprises a plurality of first light-emitting elements, the second display area comprises a plurality of second light-emitting elements, and the plurality of first light-emitting elements and the plurality of second light-emitting elements have a same distribution density; and
the second display area comprises a plurality of first pixel circuits and a plurality of second pixel circuits; the plurality of first pixel circuits are in a one-to-one correspondence electrically connected to the plurality of first light-emitting elements; and the plurality of second pixel circuits are in a one-to-one correspondence electrically connected to the plurality of second light-emitting elements;
wherein the second display area comprises a first display sub-area and a second display sub-area, wherein the first display sub-area is adjacent to the first display area and the second display sub-area is adjacent to the first display sub-area; and
at least one second pixel circuit of the plurality of second pixel circuits corresponding to at least one second light-emitting element of the plurality of second light-emitting elements in the first display sub-area is located in the second display sub-area.

2. The display panel of claim 1, wherein the first display sub-area comprises a first sub-region and a second sub-region, wherein the first sub-region and the first display area are adjacent in a first direction, the second sub-region and the first display area are adjacent in a second direction, and the first direction intersects the second direction; and
the plurality of first pixel circuits are located in at least one of the first sub-region or the second sub-region.

3. The display panel of claim 2, wherein a maximum width of the first display area in the first direction is equal to a maximum width of the second sub-region in the first direction; and
a maximum width of the first display area in the second direction is equal to a maximum width of the first sub-region in the second direction.

4. The display panel of claim 2, wherein the plurality of first pixel circuits are located in a first area; and
at least one second pixel circuit of the plurality of second pixel circuits, corresponding to at least one second light-emitting element in a second area of the plurality of second light-emitting elements, is located in the second display sub-area,
wherein the first area is the first sub-region, the second area is the second sub-region, or the first area is the second sub-region and the second area is the first sub-region.

5. The display panel of claim 4, wherein the first area comprises at least one first circuit group and at least one second circuit group, the at least one first circuit group comprises at least one first pixel circuit, the at least one second circuit group comprises at least one second pixel circuit of the plurality of second pixel circuits, and a first circuit group of the at least one first circuit group is located on one side of a second circuit group of the at least one second circuit group, wherein the one side of the second circuit group is adjacent to the first display area; and
the second display sub-area comprises at least one third circuit group and at least one fourth circuit group, wherein the at least one third circuit group comprises at least one second pixel circuit corresponding to at least one second light-emitting element in the second area, the at least one fourth circuit group comprises second pixel circuits in the second display sub-area other than the at least one second pixel circuit in the at least one third circuit group, and a third circuit group of the at least one third circuit group is located on one side of a fourth circuit group of the at least one fourth circuit group, wherein the one side of the fourth circuit group is adjacent to the second area.

6. The display panel of claim 5, wherein a size of a first pixel circuit of the plurality of first pixel circuits is equal to a size of a second pixel circuit in the at least one third circuit group;
a size of a first pixel circuit of the plurality of first pixel circuits is equal to a size of at least one second pixel circuit of the plurality of second pixel circuits in the at least one second circuit group; and
a size of a second pixel circuit in the at least one third circuit group is equal to a size of at least one second pixel circuit of the second circuits in the at least one fourth circuit group, wherein
the size of the first pixel circuit comprises a first side length in the first direction of an area where the first pixel circuit is located and a second side length in the second direction of the area where the first pixel circuit is located; the size of the second pixel circuit comprises a third side length in the first direction of an area where the second pixel circuit is located and a fourth side length in the second direction of the area where the second pixel circuit is located; and
wherein the first side length corresponding to the first pixel circuit is equal to the third side length corresponding to the second pixel circuit, and the second side length corresponding to the first pixel circuit is equal to the fourth side length corresponding to the second pixel circuit.

7. The display panel of claim 6, wherein a second circuit group of the at least one second circuit group comprises a first circuit sub-group and a second circuit sub-group, a size of a second pixel circuit in the first circuit sub-group and a size of a second pixel circuit in the second circuit sub-group are not equal, and the first circuit sub-group is located on one side of the second circuit sub-group adjacent to a first circuit group of the at least one first circuit group; and a size of a second pixel circuit in the at least one first circuit group is equal to the size of the first pixel circuit; and
a fourth circuit group of the at least one fourth circuit group comprises a third circuit sub-group and a fourth circuit sub-group, a size of a second pixel circuit in the third circuit sub-group and a size of a second pixel circuit in the fourth circuit sub-group are not equal, and the third circuit sub-group is located on one side of the fourth circuit sub-group adjacent to a third group of the at least one third circuit group; and a size of a second pixel circuit in the third circuit sub-group is equal to a size of a second pixel circuit in the third circuit group.

8. The display panel of claim 6, wherein a size of each first pixel circuit of the plurality of first pixel circuits and a size of each second pixel circuit of the plurality of second pixel circuits are equal; and the display panel further comprises a plurality of first virtual pixel circuits located in the first area and the second display sub-area, and an orthographic projection the plurality of first virtual pixel circuits on a plane where the display panel is located does not overlap an orthographic projection of the plurality of first pixel circuits on the plane where the display panel is located and does not overlap an orthographic projection of the plurality of second pixel circuits on the plane where the display panel is located.

9. The display panel of claim 8, wherein the plurality of first virtual pixel circuits are located on one side of the at least one second circuit group facing away from the at least one first circuit group and are located on one side of the at least one fourth circuit group facing away from the at least one third circuit group.

10. The display panel of claim 8, wherein at least one first virtual pixel circuit of the plurality of first virtual pixel circuits is located in one of following positions: between two adjacent first pixel circuits, between two adjacent second pixel circuits, or between two adjacent first pixel circuit and second pixel circuit.

11. The display panel of claim 10, wherein m actual pixel circuits are disposed between any two first virtual pixel circuits adjacent in the first direction of the plurality of first virtual pixel circuits, wherein m is a natural number; and when m>0, the m actual pixel circuits comprise at least one of a first pixel circuit or a second pixel circuit;

n actual pixel circuits are disposed between any two first virtual pixel circuits adjacent in the second direction, wherein n is a natural number; and when n>0, the n actual pixel circuits comprise at least one of a first pixel circuit or a second pixel circuit; and m and n are not both 0.

12. The display panel of claim 6, wherein a size of each first pixel circuit of the plurality of first pixel circuits and a size of each second pixel circuit of the plurality of second pixel circuits are equal and the plurality of first pixel circuits and the plurality of second pixel circuits are distributed in an area other than the second area in the second display area.

13. The display panel of claim 4, wherein a plurality of second virtual pixel circuits are disposed in the second area.

14. The display panel of claim 4, wherein in a direction from the first display area to the second area, first light-emitting elements in a same line are in a one-to-one correspondence electrically connected to first pixel circuits in a same line, and second light-emitting elements in a same line are in a one-to-one correspondence electrically connected to second pixel circuits in a same line.

15. The display panel of claim 14, wherein the first light-emitting elements are electrically connected to corresponding first pixel circuits through first connection lines; and at least part of the second light-emitting elements are electrically connected to corresponding second pixel circuits through second connection lines; and in a direction from the first area to the first display area, the closer a first pixel circuit is to the first display area, the longer a length of a first connection line of the first connection lines corresponding to the first pixel circuit is; and the closer a second pixel circuit is to the first display area or the second area, the longer a length of a second connection line of the second connection lines corresponding to the second pixel circuit is.

16. The display panel of claim 15, wherein the first connection lines comprise first connection sections located in the first display area; and at least one of the first connection sections is a transparent wiring.

17. The display panel of claim 1, wherein a first light-emitting element of the plurality of first light-emitting elements comprises a first anode, wherein a shape of an orthographic projection of the first anode on a plane where the display panel is located is circular.

18. A display device, comprising:

a photosensitive element and a display panel, wherein the photosensitive element is disposed corresponding to the first display area;

wherein the display panel, comprising:

a first display area and a second display area, wherein light transmittance in the first display area is larger than light transmittance in the second display area;

the first display area comprises a plurality of first light-emitting elements, the second display area comprises a plurality of second light-emitting elements, and the plurality of first light-emitting elements and the plurality of second light-emitting elements have a same distribution density; and the second display area comprises a plurality of first pixel circuits and a plurality of second pixel circuits; the plurality of first pixel circuits are in a one-to-one correspondence electrically connected to the plurality of first light-emitting elements; and the plurality of second pixel circuits are in a one-to-one correspondence electrically connected to the plurality of second light-emitting elements;

wherein the second display area comprises a first display sub-area and a second display sub-area, wherein the first display sub-area is adjacent to the first display area and the second display sub-area is adjacent to the first display sub-area; and at least one second pixel circuit of the plurality of second pixel circuits corresponding to at least one second light-emitting element of the plurality of second light-emitting elements in the first display sub-area is located in the second display sub-area.

19. The display device of claim 18, wherein the second display area comprises a first display sub-area and a second display sub-area, wherein the first display sub-area is adjacent to the first display area and the second display sub-area is adjacent to the first display sub-area; and at least one second pixel circuit of the plurality of second pixel circuits corresponding to at least one second light-emitting element of the plurality of second light-emitting elements in the first display sub-area is located in the second display sub-area.

\* \* \* \* \*